Figure 7:
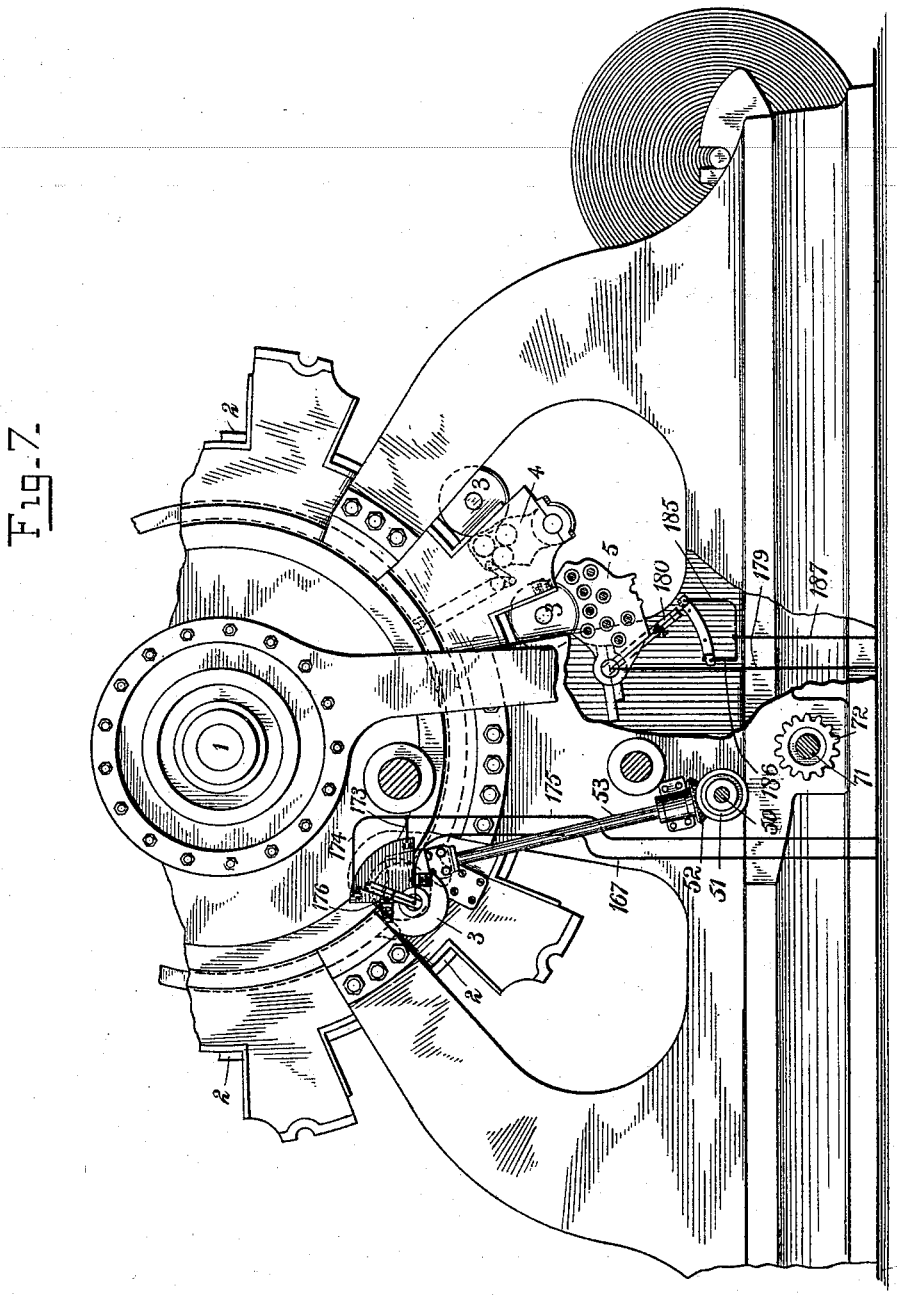

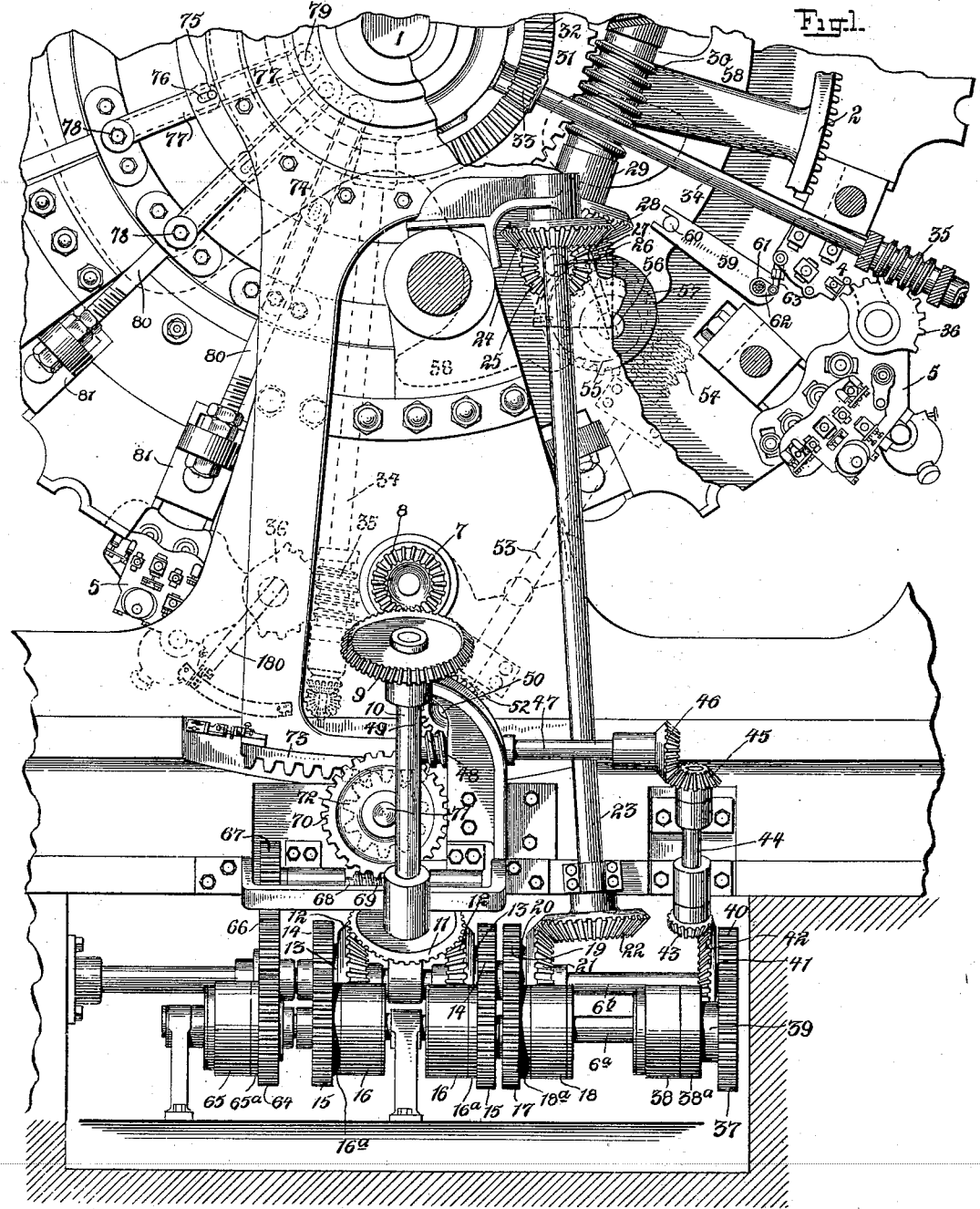

No. 637,569. Patented Nov. 21, 1899.
E. HETT.
CONTROLLING ENGINE FOR PRESSES.
(Application filed Sept. 8, 1898.)
(No Model.) 10 Sheets—Sheet 2.
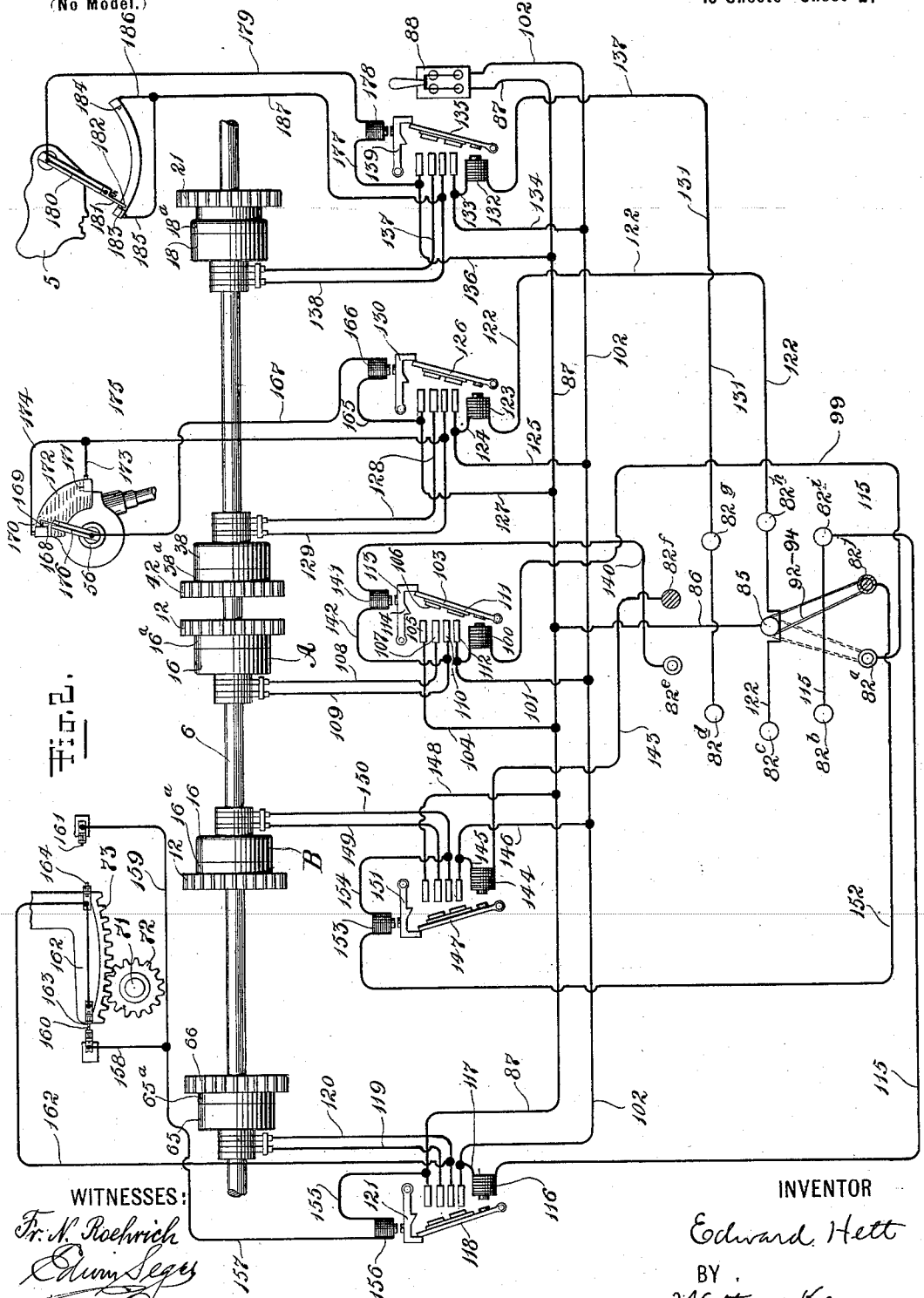
WITNESSES:
Fr. N. Roehrich
[signature]
INVENTOR
Edward Hett
BY
Witter & Kenyon
ATTORNEYS No. 637,569. Patented Nov. 21, 1899.
E. HETT.
CONTROLLING ENGINE FOR PRESSES.
(Application filed Sept. 8, 1898.)
(No Model.) 10 Sheets—Sheet 3.
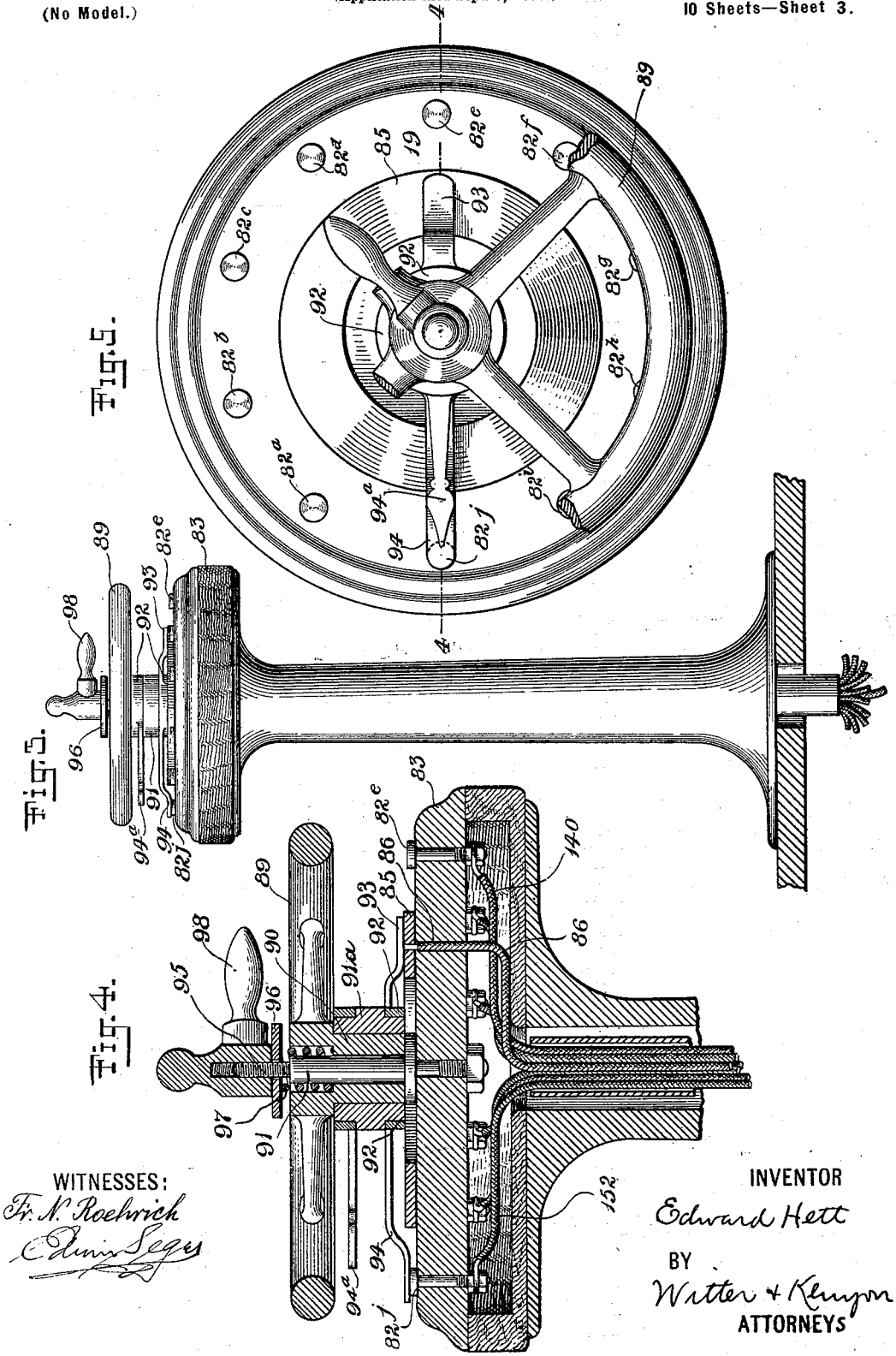
WITNESSES:
Fr. N. Roehrich
Edwin Segur
INVENTOR
Edward Hett
BY
Witter & Kenyon
ATTORNEYS
THE NORRIS PETERS CO., PHOTO-LITHO., WASHINGTON, D. C.

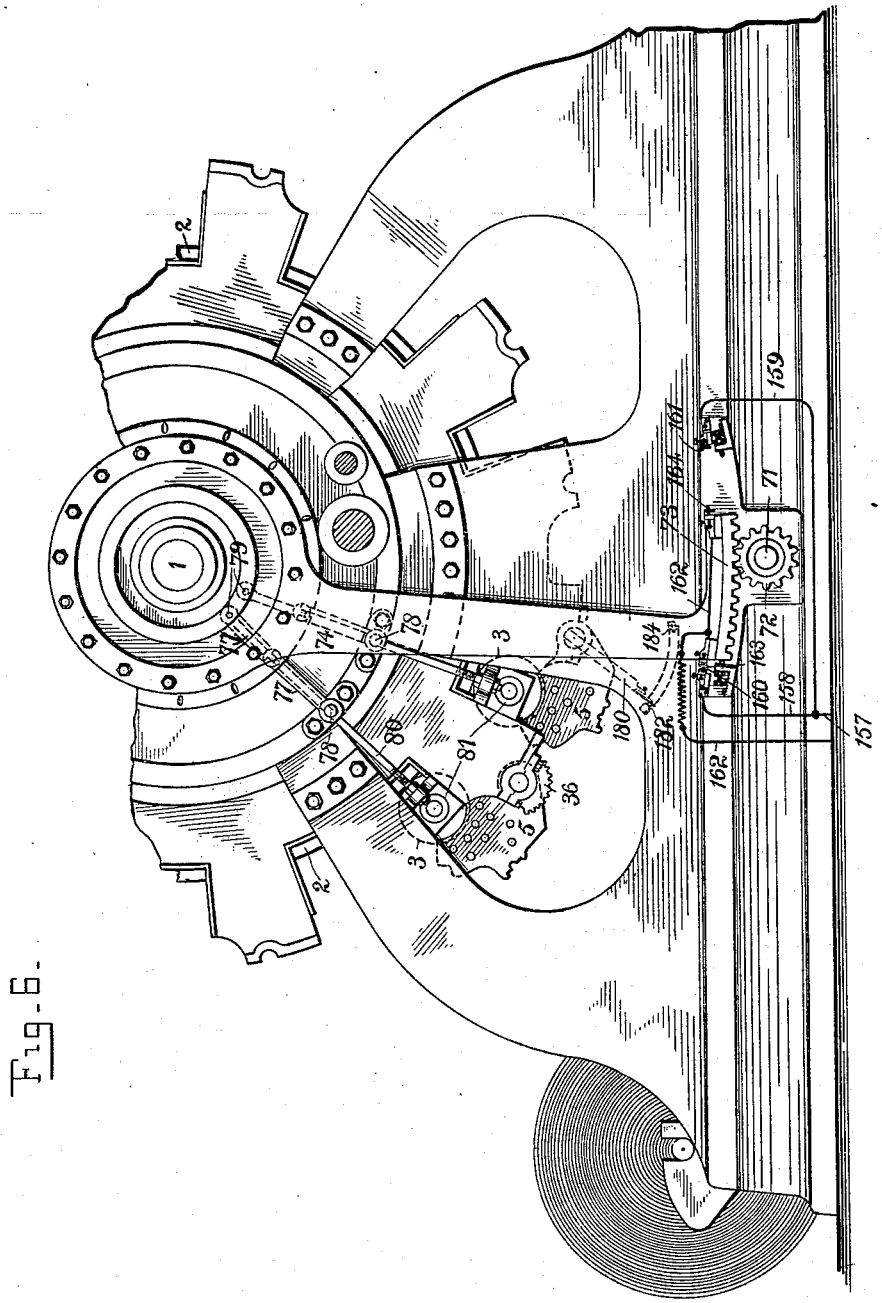

No. 637,569. Patented Nov. 21, 1899.
E. HETT.
CONTROLLING ENGINE FOR PRESSES.
(Application filed Sept. 8, 1898.)

(No Model.) 10 Sheets—Sheet 5.

WITNESSES: INVENTOR
Fr. N. Roehrich Edward Hett
BY
Walter & Kenyon
ATTORNEYS

No. 637,569.     Patented Nov. 21, 1899.
E. HETT.
CONTROLLING ENGINE FOR PRESSES.
(Application filed Sept. 8, 1898.)
(No Model.)     10 Sheets—Sheet 6.
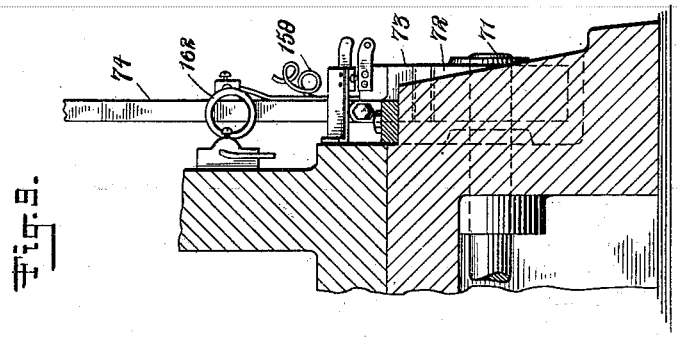
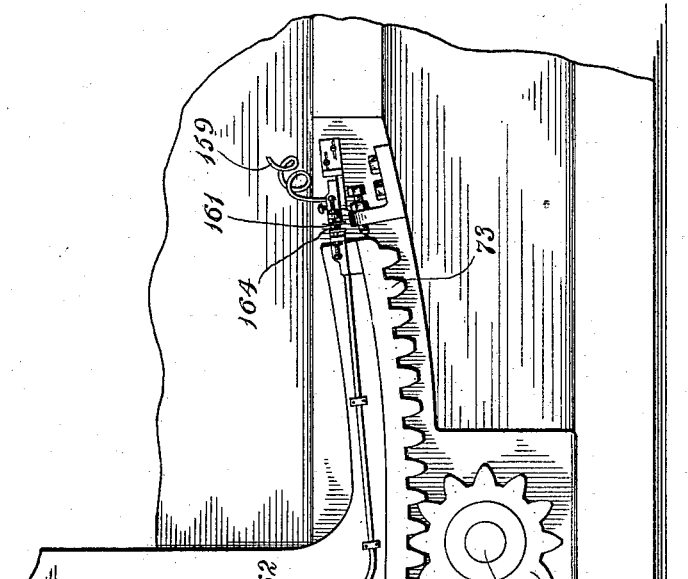
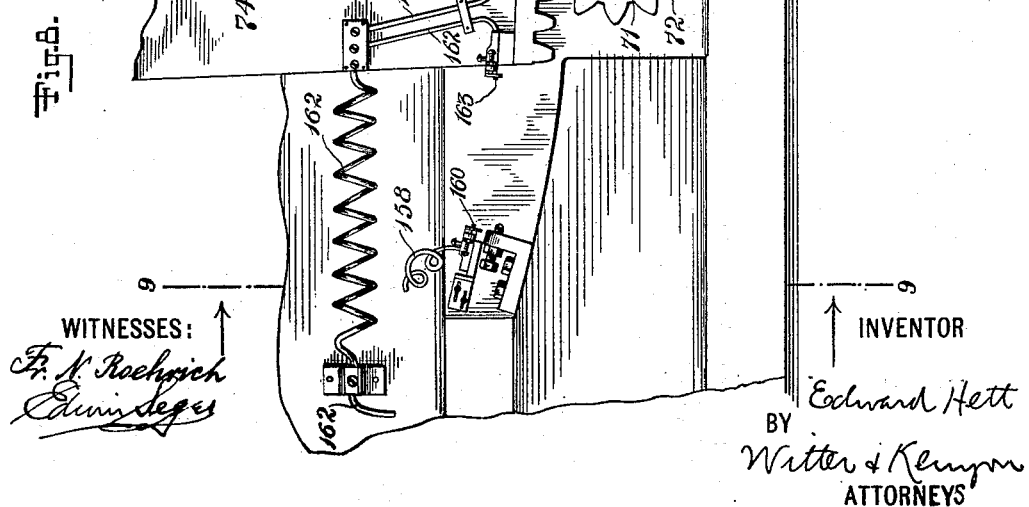
WITNESSES:     INVENTOR
Fr. N. Roehrich     Edward Hett
Edwin Seges     BY
     Witter & Kenyon
     ATTORNEYS
THE NORRIS PETERS CO., PHOTO-LITHO., WASHINGTON, D. C.

No. 637,569. Patented Nov. 21, 1899.
E. HETT.
CONTROLLING ENGINE FOR PRESSES.
(Application filed Sept. 8, 1898.)
(No Model.) 10 Sheets—Sheet 7.
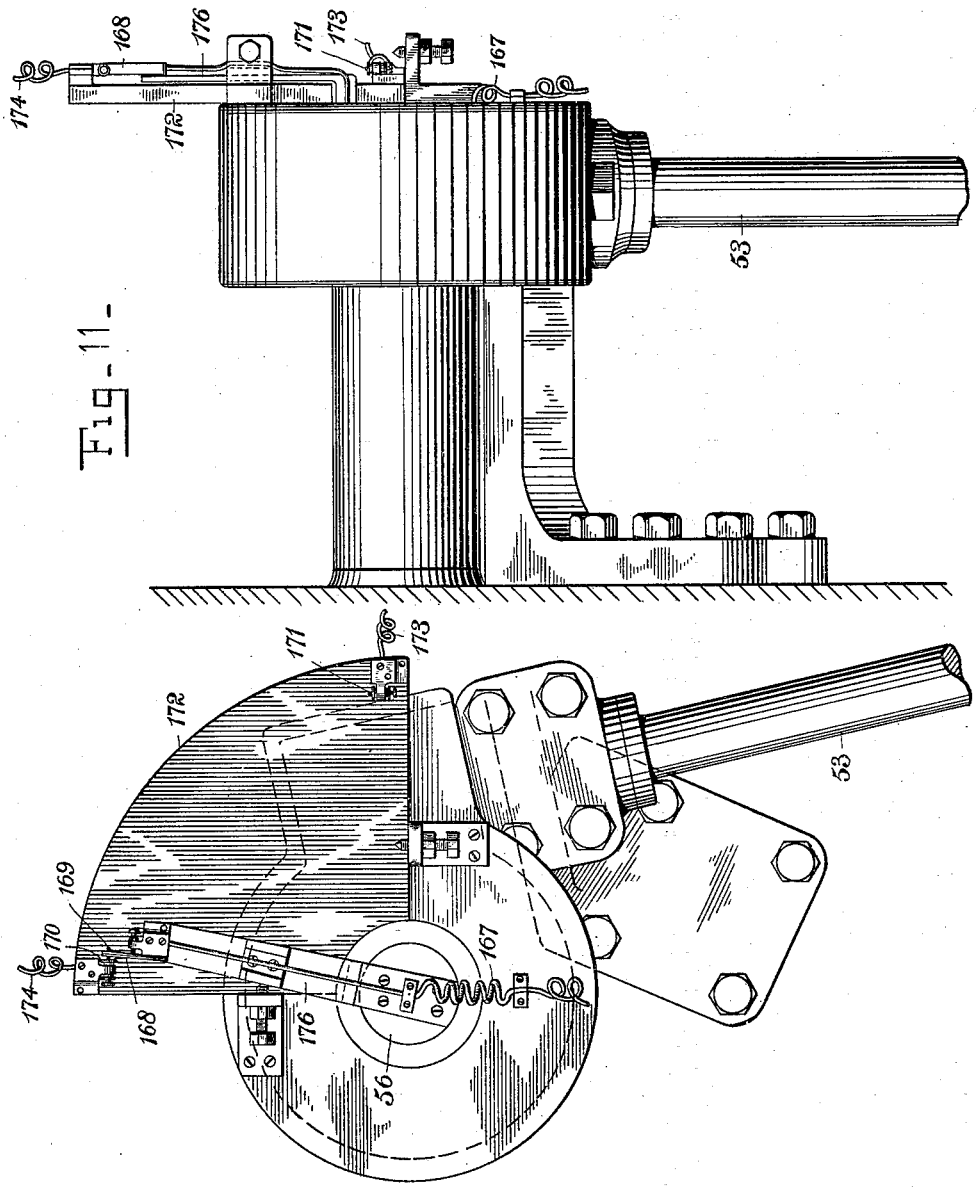
WITNESSES:
Fr. N. Roehrich
Edwin Seger
INVENTOR
Edward Hett
BY
Witter & Kenyon
ATTORNEYS No. 637,569. Patented Nov 21, 1899.
E. HETT.
CONTROLLING ENGINE FOR PRESSES.
(Application filed Sept. 8, 1898.)
(No Model.) 10 Sheets—Sheet 8.
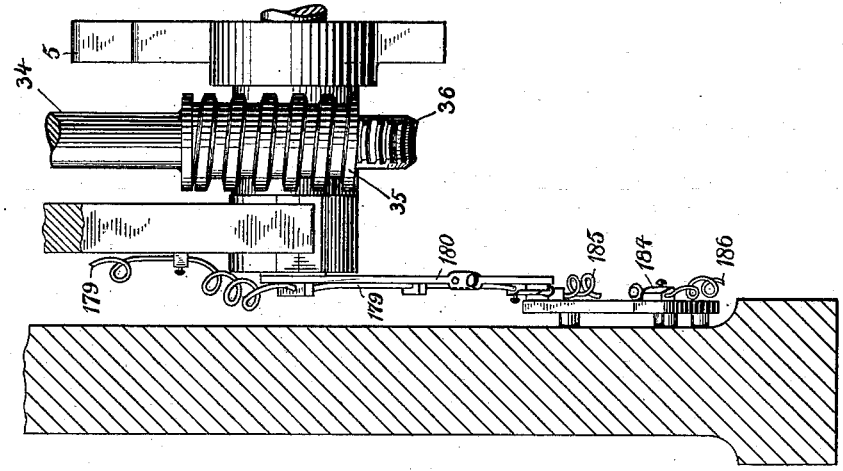
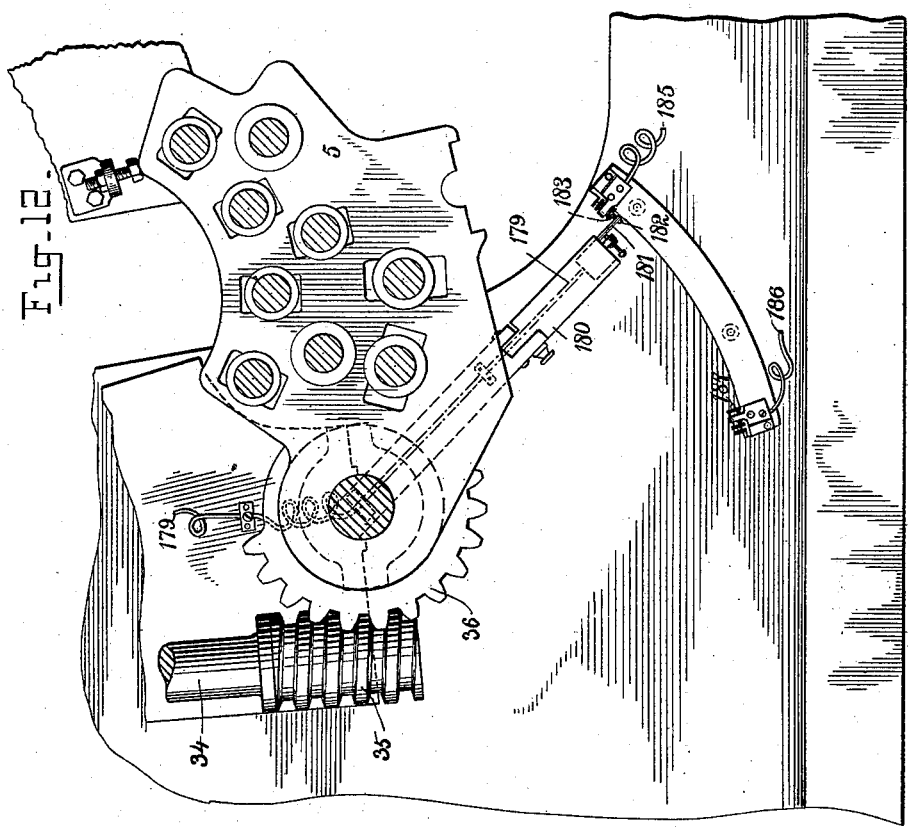
WITNESSES:
Fr. N. Roehrich
Edwin Seger
INVENTOR
Edward Hett
BY
Witter & Kenyon
ATTORNEYS No. 637,569. Patented Nov. 21, 1899.
E. HETT.
CONTROLLING ENGINE FOR PRESSES.
(Application filed Sept. 8, 1898.)
(No Model.) 10 Sheets—Sheet 9.

WITNESSES:
Fr. N. Roehrich
Edwin Seger

INVENTOR
Edward Hett
BY
Witter & Kenyon
ATTORNEYS

THE NORRIS PETERS CO., PHOTO-LITHO., WASHINGTON, D. C.

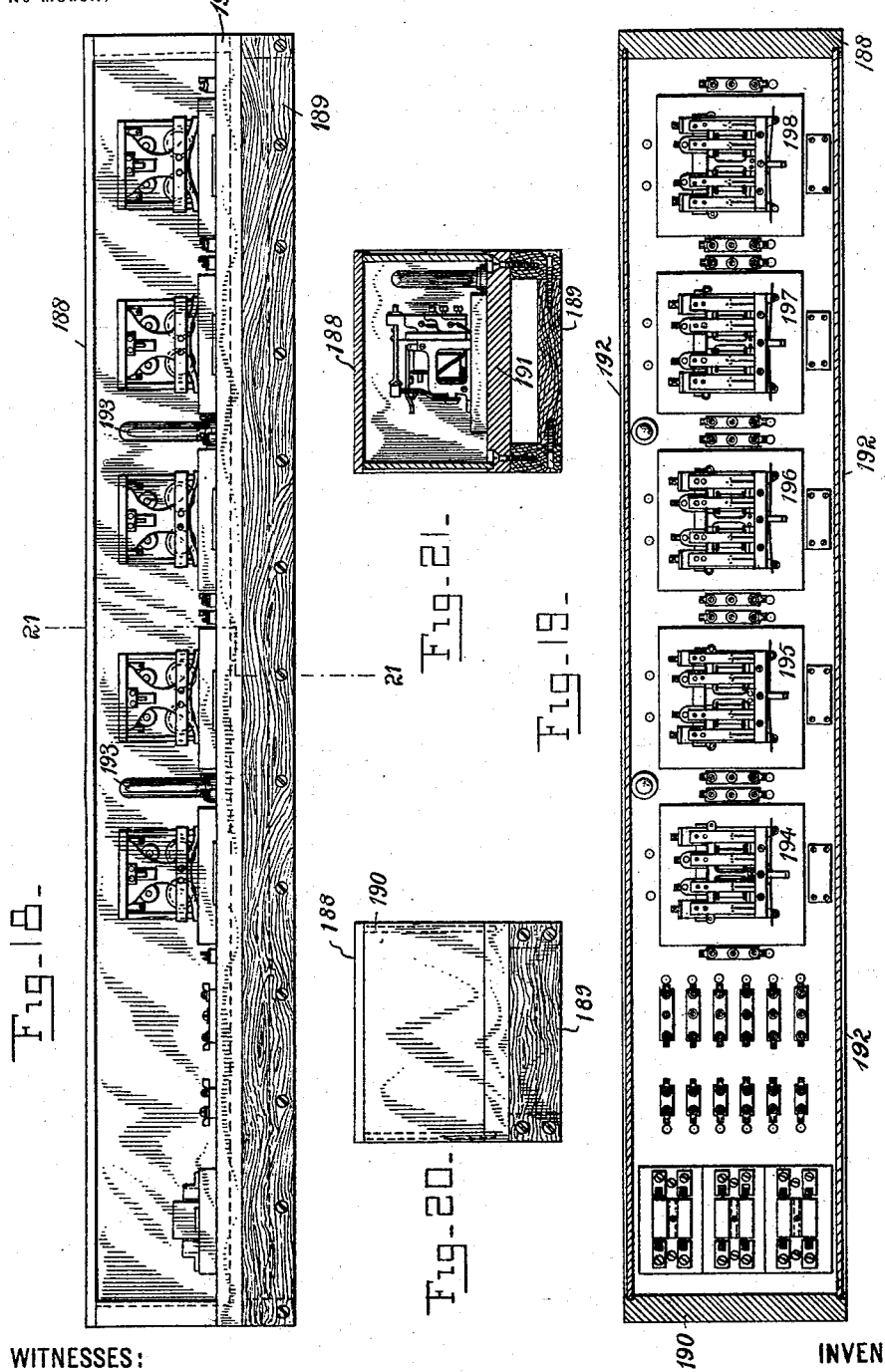

UNITED STATES PATENT OFFICE.

EDWARD HETT, OF NEW YORK, N. Y.

CONTROLLING-ENGINE FOR PRESSES.

SPECIFICATION forming part of Letters Patent No. 637,569, dated November 21, 1899.

Application filed September 8, 1898. Serial No. 690,480. (No model.)

*To all whom it may concern:*

Be it known that I, EDWARD HETT, of New York, (New Dorp,) in the county of Richmond, State of New York, have invented certain new and useful Improvements in Controlling-Engines for Presses, of which the following is a specification.

My invention relates to presses, and more especially to devices for controlling the movements of parts of the mechanism of presses—as, for example, for controlling the movements, in a lithographic press, of the printing-surfaces, the inking mechanisms, and the damping mechanisms into and out of operative position.

It has for its object to provide means for controlling the movement of parts of presses, especially movements of parts of the press into and out of operative position, to effect such control more easily, readily, efficiently, and with greater precision and certainty than has heretofore been possible, and to provide means for this purpose which are simple in character, efficient in operation, and which enable the operator at all times to maintain control over the movements of different parts of the press.

It has also for its object to provide means automatically operated by the part of the press to be moved at the limit of its movement for automatically stopping the movement of such part at a predetermined point in order to insure against breakage and to attain greater precision and certainty in the movement of such part.

My improved devices are primarily intended to be used with and are here described as appurtenant to a multicolor lithographic printing press such as is shown and described in my application for a patent filed June 1, 1898, known as Serial No. 593,796; but I do not limit my improved devices here shown and claimed to use in such a press, as it is evident that they can be employed with advantage in any lithographic or other press in which rollers for printing, inking, damping, or other similar purpose or other parts of the press are to be moved—as, for example, toward or away from an impression-drum or printing-surface.

In the operation of the multicolor-press in connection with which my improved devices are here shown and described it is necessary to move the entire series of printing-surfaces out of or into contact with the impression-surface, to move the inking mechanisms out of or into contact with the printing-surfaces by swinging the ink-frames carrying the inking mechanisms, and to move the damping mechanisms out of or into contact with the printing-surfaces by swinging the damping-frames carrying the damping mechanisms, and it is in connection with these movements and to control them that my improved devices are herein shown and described.

In the preferred form of my improved controlling-engine shown and described herein I employ connecting mechanism or mechanisms between the driving mechanism of the controlling-engine hereinafter referred to and the part or parts of the press to be moved connecting the said driving mechanism with the said part or parts of the press-driving mechanism, preferably driven by the driving mechanism of the press, for imparting motion through the said connecting mechanism or mechanisms to the said part or parts of the press to be moved, and suitable clutch mechanism, preferably electric, to connect and disconnect the driving mechanism of the controlling-engine with some suitable source of power, preferably the driving mechanism of the press, and to connect the said driving mechanism of the controlling-engine with the said connecting mechanism or mechanisms and to disconnect them. I prefer to use in my controlling-engine driving mechanism which is capable of motion in either direction, as I am thus enabled, by the use of the same controlling mechanism, to impart to the part or parts of the press to be moved a movement one way or the other, as desired. Such movement one way or the other I obtain by employing, preferably between the source of power and the driving mechanism of the controlling-engine, clutch mechanism preferably which is capable of assuming any of three separate positions, in one of which the source of power is wholly disconnected from the driving mechanism of the controlling-engine, in which case the part or parts of the press to be moved remain at rest, and in the other two of which positions the driving mechanism of the controlling-engine is connected with the source of power, in one of said positions to impart motion in one direction to the driving mechanism of the controlling-engine to move the part or parts of the press one way, and in the other of said positions to impart motion in the opposite direction to the driving mechanism of the controlling-engine to move the said part or parts of the press the other way. My preferred form of mechanism for this purpose is shown in the drawings and consists of two clutch gear-wheels, intermediate between the source of power and the main-shaft of my controlling-engine, and a clutch adapted to cause one or the other or neither of the clutch gear-wheels to connect the source of power with the said shaft, although of course any other mechanism suitable for the purpose may be employed.

I will now proceed to describe the particular form of controlling-engine shown in the drawings herein.

Figure 14:
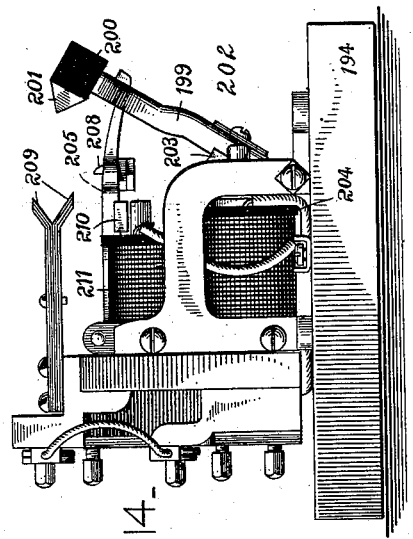
Figure 16:
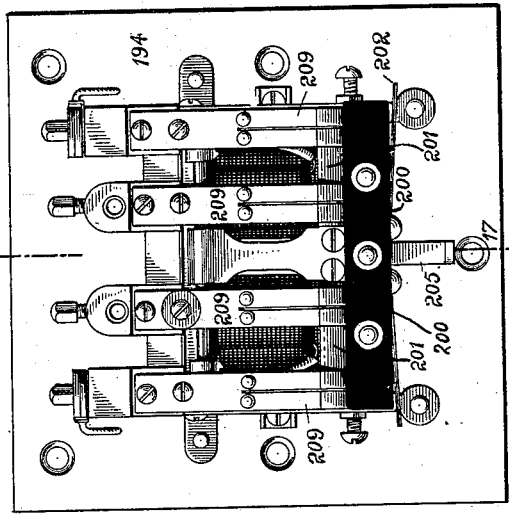
Figure 15:
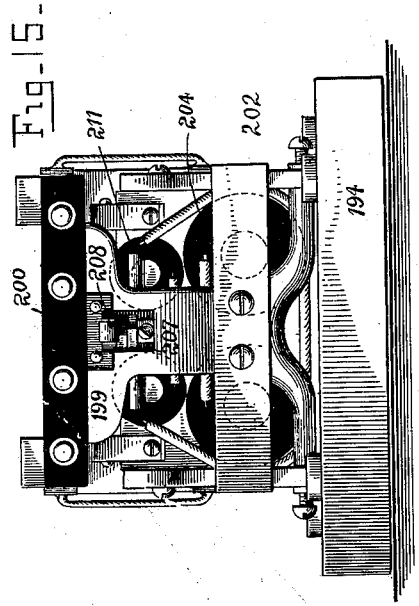
Figure 17:
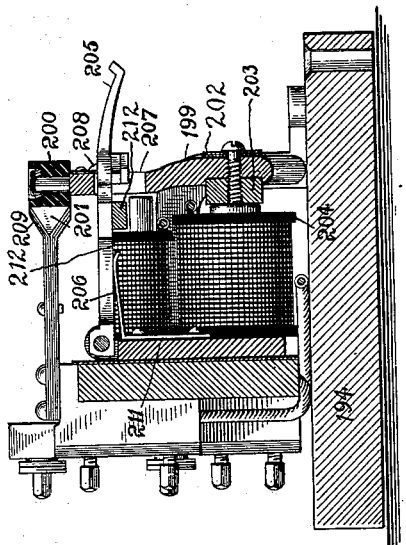

Figure 1 is a side view of such controlling-engine and of a part of a multicolor lithographic press such as is shown in my said application for a patent, Serial No. 593,796, with the casing removed and with certain parts broken away to show more fully the operation of the parts. Fig. 2 is a diagrammatic plan showing the circuits preferably used by me in the operation of my controlling-engine. Fig. 3 is a side view of a hand-wheel and connections and the standard upon which it is mounted for operating the circuit-controllers hereinafter described. Fig. 4 is a vertical cross-section through the upper part of the said standard, and Fig. 5 is a plan of the same. Fig. 6 is a side view of a part of the said multicolor-press, taken on the side of the press where the controlling-engine is located, but with the controlling-engine omitted and the casing removed. Fig. 7 is a similar view of the other side of the press. Figs. 8 and 9 are detail views showing means for automatically stopping the printing-cylinders when they have reached the limit of their movement. Figs. 10 and 11 are similar details of means for automatically stopping the damping-frames at the limits of their movement, and Figs. 12 and 13 are detail views of means for similarly automatically stopping the inking-frames at the limits of their movement. Fig. 14 is a side view, Fig. 15 an end view, and Fig. 16 a plan view, of one form of the circuit-controllers used in the clutch-circuits to be hereinafter described, the catches therefor, and the electromagnets for operating the same; and Fig. 17 is a vertical section of the same, taken on the line 17 17 of Fig. 16, viewed as shown by the arrow. Fig. 18 is a front view, Fig. 19 a plan, and Fig. 20 a side or end view, of a box containing the said various circuit-controllers, catches, and electromagnets, &c.; and Fig. 21 is a vertical cross-section taken on the line 21 21 of Fig. 18.

1 is the shaft upon which impression-drum 2 of the multicolor lithographic press shown in Figs. 1, 6, and 7 is located. This multicolor lithographic press is substantially the same as that shown and described in my said application, Serial No. 593,796, and the mechanism of it will not be described in detail any further than is necessary to convey a clear idea of the connection therewith of and the control of the operation of certain parts thereof by my improved controlling-engine. The parts of this press which are moved into or out of operative position by means of my controlling-engine are the printing-cylinders 3 3, damping-frames 4 4, and the inking-frames 5 5. The mechanism by which my controlling-engine moves these into or out of operative position will be presently described.

My controlling-engine proper has a shaft which is preferably adapted to rotate in either direction and is preferably driven by the driving mechanism of the press and is connected by connecting mechanism, to be presently described, with the printing-cylinders, damping-frames, and inking-frames. This shaft is shown in Fig. 2 as a single shaft 6; but I prefer in place of a single shaft to use two shafts for the same purpose. These shafts are the shafts $6^a$ $6^b$, as shown in Fig. 1. This shaft is provided with gear-wheels and with clutch mechanism, preferably electric. It is immaterial whether one or two shafts be used, as the effect is substantially the same in both cases. I prefer the double form (shown in Fig. 1) for the reason that the gear-wheels can be placed upon one part of the compound shaft and the electric clutch mechanism upon the other part, thus enabling a shorter shaft to be used and the mechanism to be made more compact and smaller in size. The shaft of the controlling-engine is preferably driven by the driving mechanism of the press, although any suitable driving mechanism may be employed for that purpose. As shown in Fig. 1, the main driving-shaft 7 of the press carries at one end a beveled gear-wheel 8, which meshes with gear-wheel 9 upon shaft 10. Shaft 10 carries at its other end a beveled gear-wheel 11.

In order to impart motion to the shaft of the controlling-engine in either direction, as desired, two clutch gear-wheels 12 12 are interposed between the shaft and beveled gear-wheel 11. Gear-wheels 12 12 are loosely mounted on the shaft $6^b$ (shown in Fig. 1) and mesh with gear-wheel 11. As shown, each gear-wheel 12 is rigidly secured to a separate sleeve 13, each of which sleeves turns loosely on the shaft $6^b$ and also carries at its other end gear-wheel 14, the latter meshing with gear-wheel 15, loosely mounted upon shaft $6^a$.

16 and $16^a$ are the two parts of an electric clutch for connecting each gear-wheel 15 with shaft $6^a$, part 16 of the clutch being connected with shaft $6^a$, so as to be capable of motion longitudinally along the shaft, but rotating with the shaft. This may be accomplished by any well-known means—such, for instance, as by spline and feather. Part $16^a$ is integral with gear-wheel 15 and is loose upon the shaft 6ᵃ. The form of this clutch mechanism may be of any suitable kind. Details are accordingly not shown. This electric clutch mechanism is so arranged that, when the current is passed through it, the two parts of the clutch mechanism will lock together, thus causing shaft 6ᵃ to rotate in one direction or the other, depending upon which of the electric clutch mechanisms 16 16ᵃ is energized. In this way the shaft of the controlling-engine is driven one way or the other, as desired.

17 is a gear-wheel loosely mounted upon shaft 6ᵃ.

18 and 18ᵃ are the two parts of an electric clutch mechanism for connecting the gear-wheel 17 with shaft 6ᵃ, the part 18 rotating with shaft 6ᵃ and movable longitudinally thereon, and part 18ᵃ being integral with gear-wheel 17. Gear-wheel 19, mounted upon sleeve 20 on shaft 6ᵇ, meshes with gear-wheel 17. Sleeve 20 also carries gear-wheel 21. When electric clutch mechanism 18 18ᵃ is energized, gear-wheel 21 rotates one way or the other, depending on the direction of rotation of the shaft 6ᵃ. Gear-wheel 21 is intermediate between the shaft of the controlling-engine and the connecting mechanism connecting the controlling-engine with the inking-frames. This connecting mechanism is as follows, namely: beveled gear-wheel 22 on shaft 23, beveled gear 24 on the other end of the shaft meshing with beveled gear 25 on shaft 26, the latter carrying at its other end gear-wheel 27, gear-wheel 28 on shaft 29 meshing with gear 27, worm 30 on said shaft meshing with worm-wheel 31, mounted on shaft 1 of the press and having teeth 32 on its face, beveled gear 33 on shaft 34 meshing with teeth 32 and carrying at its other end the worm 35, which meshes with worm-wheel 36, secured to inking-frame 5. Each inking-frame has a similar worm-wheel 36, shaft 34, with worm 35, and beveled gear-wheel 33 meshing with the same teeth 32 on worm-wheel 31. Thus whenever clutch mechanism 18 18ᵃ is energized the shaft of the controlling-engine, through gear-wheel 21 and the above-described connecting mechanism, moves all of the inking-frames of the press simultaneously into or out of operative position, depending upon which one of the two electric clutch mechanisms 16 16ᵃ is energized. If one is energized, the inking-frames are moved so as to throw the inking-rollers into operative position, and if the other clutch mechanism 16 16ᵃ is energized the inking-frames are moved so as to move the inking-rollers out of operative position.

Shaft 26 carries two gear-wheels 25 and 27, one on each side of the outer frame of one side of the press, the inner one meshing with a beveled gear 28 on a shaft 29, having a worm 30 meshing with a similar worm-wheel 31, having similar teeth 32. Each inking-frame on one side of the press is similarly provided with a worm-wheel 36, a worm 35 on shaft 34, and beveled gear 33, meshing with teeth 32. The inking-frames at the other side of the press are connected by any suitable means to the inking-frames thus driven by the worm 35. Accordingly when electric clutch mechanism 18 18ᵃ is energized all the inking-frames on each side of the press are simultaneously swung so as to move the inking-rollers into or out of operative position, depending upon which one of the two electric clutch mechanisms 16 16ᵃ is energized.

The mechanism for moving the damping-frames so as to bring the damping-rollers into or out of operative position consists of the following:

37 is a gear-wheel loosely mounted upon shaft 6ᵃ.

38 and 38ᵃ are the two parts of an electric clutch mechanism for operatively connecting gear-wheel 37 to shaft 6ᵃ, 38 revolving with shaft 6ᵃ and having longitudinal motion thereon, as by spline and feather, and 38ᵃ being fixedly secured by sleeve 39 to gear-wheel 37.

40 is a gear-wheel mounted upon sleeve 41, loosely mounted upon shaft 6ᵇ, said sleeve also carrying beveled gear-wheel 42. When electric clutch mechanism 38 38ᵃ is energized, gear-wheel 42 is rotated one way or the other, depending upon the direction of rotation of shaft 6ᵃ, in the manner above described. The connecting mechanism between gear-wheel 42 and the damping-frames of the press consists of the following-described mechanism: beveled gear-wheels 43 on shaft 44, the latter carrying at its other end beveled gear 45, beveled gear 46 upon shaft 47 meshing with beveled gear 45, worm 48 upon shaft 47 meshing with worm-wheel 49 upon shaft 50. Shaft 50 runs across to the other side of the press and through the frame and carries at its further end a beveled gear-wheel 51, (shown in Fig. 7,) beveled gear 52 on shaft 53 meshing with beveled gear 51, shaft 53 carrying at its further end worm 54, worm-wheel 55 on shaft 56 meshing with worm 54; eccentric 57, fixedly mounted on shaft 56 and working in a similar-shaped opening in wheel 58, loosely mounted on shaft 1; arms 59, each provided with fingers encircling a pin 60, secured to wheel 58, and each pivoted at 61 and having crank-arms 62 63, the latter connected to a damping-frame 4. On the nearer side of the machine there are also parts corresponding to beveled gear 51, shaft 53, with its gear 52 and worm 54, gear-wheel 55, shaft 56, eccentric 57, wheel 58, and arms 59 and the other connections, so that each set of damping-frames is slightly rocked one way or the other whenever electric clutch mechanism 38 38ᵃ is energized. Each set of damping-frames has a corresponding arm 59, pin 60, and crank-arms 62 and 63, so that all of the damping-frames of the press are simultaneously rocked backward or forward, so as to move the damping-rollers into or out of operative position, depending on whether one or the other of electric clutch mechanism 16 16ª is energized.

The mechanism for controlling the movement of the printing-cylinders into or out of operative position consists of the following:

64 is a gear-wheel loosely mounted upon shaft 6ª.

65 and 65ª form electric clutch mechanism for operatively connecting gear-wheel 64 with shaft 6ª, 65 rotating with said shaft and being capable of longitudinal motion thereon, as above described, and 65ª being integral with gear-wheel 64.

66 is a gear-wheel loosely mounted upon shaft 6ᵇ. As electric clutch mechanism 65 65ª is energized, gear-wheel 66 is caused to rotate one way or the other with shaft 6ª, depending upon which one of the two electric clutch mechanisms 16 16ª is energized. The connecting mechanism between gear-wheel 66 and the printing-cylinders consists of the following mechanism: gear-wheel 67 on shaft 68, the latter carrying at its other end worm 69; worm-wheel 70 meshing with worm 69 and mounted on shaft 71, the shaft carrying two gear-wheels 72, one at each side of the press, each gear-wheel 72 meshing with a toothed segment 73 of a wheel 74, loosely mounted on shaft 1 of the press. Each wheel 74 on each side of the machine carries pins 75, working in a slot 76 in the two inner ends of the toggle-joint 77 77, the inner end of the toggle-joint, toward the center of the press, being free to move radially inward or outward from the center, the outward end of the toggle-joint being secured to the framework at 78. To the inner end 79 of each toggle-joint is secured a shaft 80, carrying at its outer end one of the bearing-boxes 81 of a printing-cylinder. A similar shaft with its toggle-joint arrangement carries the other bearing of the printing-cylinder at the other side of the machine. There is a similar arrangement of toggle-joint-and-shaft connection between each bearing of each printing-cylinder of the press and each wheel 74 as that above described. Accordingly, as wheel 74 moves one way or the other when electric mechanism 65 65ª is energized and one or the other of electric clutch mechanisms 16 16ª is energized, the printing-cylinders are moved inward against the drum, or in operative position for printing, or are moved outward therefrom. By means of the two clutch gear-wheels 12 12 and their respective clutch mechanisms 16 16ª, intermediate between the shaft of the controlling-engine and the driving mechanism of the press, I am enabled to rotate the shaft in one direction or the other, as desired, by energizing one or the other of the said electric clutch mechanisms, and by means of each gear-wheel and its respective electric clutch mechanism, intermediate between the shaft of the controlling-engine and the connecting mechanism connecting with the different parts of the press to be moved, as above described, I am enabled to impart motion to the different parts of the press to be moved in one direction or the other, depending upon the direction of rotation of the said shaft, or am enabled to stop the motion of any of such part or parts by deënergizing the proper electrical clutch mechanism.

The mechanism of my controlling-engine may be itself controlled by the operator in any suitable manner and by any suitable means. I prefer, however, to effect such control by means of electric circuits which are controlled, preferably, by circuit-controllers under the control of the operator, as hereinafter described. I have shown in Fig. 2 and will now proceed to describe my preferred system of electric circuits for this purpose.

In my preferred system I employ a series of circuits, preferably normally open, one for each electric clutch mechanism, and these circuits, for purposes of clearness and conciseness, I will designate as "clutch-circuits." When the clutch-circuit of any clutch mechanism is closed, the said clutch mechanism will be energized, and when the circuit is broken the clutch mechanism will be deënergized. I also employ a series of circuits, each containing an electromagnet, for the purpose of making and breaking the clutch-circuits, and these circuits are denominated herein and will be referred to as "operating-circuits." Each clutch-circuit has its corresponding operating-circuit. Each operating-circuit is normally open and has a circuit-controller which can be closed by the operator, each operating-circuit being thus under the control of the operator. Preferably the operator makes the operating-circuit by closing the circuit-controller, and this energizes an electromagnet in said circuit, the latter attracting the circuit-controller of its corresponding clutch-circuit, closing said circuit. As the closing of the operating-circuits by the operator is but momentary, I employ a catch for seizing and holding the circuit-controller of the clutch-circuit in its closed or operative position, thus keeping the clutch-circuit, through the clutch mechanism, closed until it becomes necessary to open it. To release these catches and break the clutch-circuits, I have arranged a series of circuits, which I will refer to as "releasing-circuits," each containing an electromagnet adapted, when operated, to withdraw the catch, so as to release the said circuit-controller of the clutch-circuit to permit it to open and break the clutch-circuit. I preferably place a circuit-controller in each of the releasing-circuits, which is adapted to be closed to make the releasing-circuit and to energize an electromagnet therein to withdraw the catch for the above purpose, and I preferably arrange this so that the part of the press which is being moved will at the limit of its movement automatically close one of the said releasing-circuits, and thus break the circuit through the clutch mechanism which connects the said part of the press and its connecting mechanism with the shaft of the controlling-engine to insure the stoppage of the said part of the press at the proper time and to prevent breakage of the parts. This mechanism will presently be described.

In Fig. 2 I have shown a diagrammatic plan of the various circuits referred to above. In this figure I have shown the shaft 6 of the controlling-engine as being composed of but one part and as carrying the gear-wheels 12, 21, 42, and 66, here shown as spur gear-wheels, connecting with the various trains of gearing comprising the connecting mechanisms connecting with the different parts of the press to be moved, and also corresponding clutch mechanisms 16 16$^a$, 18 18$^a$, 38 38$^a$, and 65 65$^a$ as arranged upon the one shaft 6. This construction, however, is in all substantial respects the same as that shown in Fig. 1, where the shaft of the controlling-engine consists of two separate shafts 6$^a$ 6$^b$. In Fig. 2 I have not represented the driving mechanism of the press, nor have I shown the connecting mechanisms connecting the different gear-wheels with the different parts of the press to be moved.

The clutch-circuits and operating-circuits referred to above are placed under the control of the operator by means of the hand-wheel and circuit-controllers shown in Figs. 3, 4, and 5, in which 82$^a$, 82$^b$, 82$^c$, 82$^d$, 82$^e$, 82$^f$, 82$^g$, 82$^h$, 82$^i$, and 82$^j$ are metallic studs mounted in a plate 83, made of wood or other suitable insulating material and connected at their lower ends by wires, as hereinafter described. Plate 83 has on its upper surface a metallic ring 85, connected by wire 86 with a main-line wire 87, running through switch 88 to one pole of the battery or other source of electricity—as, for instance, to the negative pole. Hand-wheel 89 is mounted upon a sleeve 90, adapted to turn loosely on stationary stud 91, which is secured to plate 83, as shown in Fig. 4. Sleeve 90 carries insulating material 91$^a$, and also secured to this insulating material is a ring 92, which has two projecting fingers 93 and 94, the former, 93, bearing down upon and making contact at all times with metallic ring 85, and finger 94 making contact with metallic studs 82$^a$ 82$^b$, &c., as the hand-wheel is turned. Whenever 94 rests upon the top of one of the studs 82$^a$ 82$^b$, &c., it closes a circuit, as will hereinafter be described. Ring 92, with its fingers 93 and 94, thus forms a circuit-controller which is under the control of the operator. As the operator turns hand-wheel 89 from one stud to the other he successively closes and breaks different circuits, as will be presently described.

In order to lock the hand-wheel in any given position and also to cause the fingers 93 and 94 to make better contact with ring 85 and the different metallic studs, I have placed a screw-thread 95 upon the upper part of stud 91 and have placed upon such portion of the stud an encircling plate 96, normally held out of contact with hand-wheel 89 by means of spring 97 and also handle 98, similarly interiorly screw-threaded. By turning handle 98 in the proper direction the plate 96 will be forced down upon hand-wheel 89, locking it and forcing fingers 93 and 94 into better contact with ring 85 and studs 82$^a$ 82$^b$, &c. The finger 94 stands normally in contact with stud 82$^j$, as shown in full lines in Fig. 2. In this position the machine is at rest.

The different clutch mechanisms on the shaft of the controlling-engine are operated by a series of circuits, one for each clutch mechanism, which circuits for purposes of clearness and brevity I will refer to as "clutch-circuits." Each of these clutch-circuits has a circuit-controller adapted to make or break the circuit. Each of these circuit-controllers I place under the control of an electromagnet in another circuit. The latter series of circuits I will refer to herein as "operating-circuits." Each of these operating-circuits is directly under the control of the operator by means of the hand-wheel 89 and the fingers 92 and 94 and studs 82$^a$ 82$^b$, &c. In addition to these circuits I also provide what I term "releasing-circuits." These circuits each contain an electromagnet which is adapted to withdraw a catch to permit the circuit-controller of each clutch-circuit to open or resume its inoperative position. Some of these circuits are placed under the direct control of the operator, and others are preferably placed so as to be automatically controlled by the movements of the different parts of the press as they reach the limit of their movement.

I will now proceed to describe the various circuits operating the clutch mechanism. In this description I will describe the circuits as they are successively operated by the operator as he turns hand-wheel 89.

Hand-wheel 89 rests normally so that finger 94 rests upon stud 82$^j$. In this position the machine is at rest. He then turns the hand-wheel so as to bring finger 94 upon stud 82$^a$. This closes the following operating-circuit—namely, from the negative side of the source of electricity through switch 88, wire 87, wire 86, ring 85, finger 93, ring 92, finger 94, stud 82$^a$, wire 99, electromagnet 100, wire 101, main-line wire 102, switch 88 to positive side of the source of electricity. This energizes magnet 100 and pulls forward circuit-controller 103. This circuit-controller I speak of as the "circuit-controller of one of the clutch-circuits" for the reason that when it is pulled forward it makes or closes that clutch-circuit—to wit, the following-described clutch-circuit: from negative side of the source of electricity, switch 88, wire 87, wire 104, stud 105, bridge 106 on circuit-controller 103, stud 107, wire 108, electric clutch mechanism 16 16$^a$ to the right, as seen in Fig. 2, which electric clutch mechanism I have designated in Fig. 2 by the letter A to distinguish it from the electric clutch mechanism 16 16$^a$ to the left in Fig. 2, which I have designated by the letter B for the purpose of distinction, wire 109, stud 110, bridge 111 upon circuit-controller 103, stud 112, wire 101, main-line wire 102, switch 88, to the positive side of the source of electrical energy. Thus by closing circuit-controller 103 through the energizing of magnet 100 electric clutch mechanism 16 16ᵃ (A) is energized, the two parts of the clutch are gripped together, and shaft 6 is caused to rotate with gear-wheel 12, which wheel, as explained above, is constantly rotating, being driven by the rotating mechanism of the press. Rotation is thus imparted in one direction to shaft 6. The operator then moves the hand-wheel until finger 94 rests upon the next stud 82ᵇ. The moment finger 94 leaves stud 82ᵃ the operating-circuit above described is broken and electromagnet 100 is deënergized. In order to prevent circuit-controller 103 from falling back and breaking the circuit through electric clutch mechanism 16 16ᵃ (A) and stopping the rotation of shaft 6 at once, I provide a catch 113, which has a toe 114, adapted to fall behind and seize circuit-controller 103 when it is closed by magnet 100 and to hold the circuit-controller in its closed position until the catch is withdrawn, as hereinafter described. By these means shaft 6 continues to rotate. As soon as finger 94 reaches stud 82ᵇ the following-described operating-circuit is closed—namely, from negative side of the battery, switch 88, main-line wire 87, wire 86, parts 85 93 92 94, stud 82ᵇ, wire 115, electromagnet 116, wire 117, main-line wire 102 to positive side. This operating-circuit when closed energizes magnet 116, and this magnet closes circuit-controller 118. As this circuit-controller closes it closes a clutch-circuit through electric clutch mechanism 65 65ᵃ. I therefore call the circuit-controller 118 the "circuit-controller of the said clutch-circuit." This clutch-circuit through electric clutch mechanism 65 65ᵃ is as follows—viz., from negative side of the switch 88, main-line wire 87, studs and bridge upon circuit-controller 118, wire 119, electric clutch mechanism 65 65ᵃ, wire 120, studs and bridge on circuit-controller 118, main-line wire 102 to positive side. As soon as the circuit-controller 118 is closed by magnet 116 catch 121 seizes and holds it in its closed position in the manner above described. Thus by moving finger 94 upon stud 82ᵇ the operator has closed an operating-circuit. The latter has closed the clutch-circuit through clutch mechanism 65 65ᵃ, thus causing the two parts of the clutch to revolve together, taking with them gear-wheel 66. As above described, this gear-wheel 66 communicates motion through a train of gearing and causes all of the printing-cylinders in the press to be moved inward against the impression-drum. The operator then moves the hand-wheel; but although the circuit through magnet 116 is broken as finger 94 leaves stud 82ᵇ catch 121 holds circuit-controller 118 in its closed or operative position, thus maintaining the closed circuit through clutch mechanism 65 65ᵃ. Hence gear-wheel 66 continues to rotate until stopped, as hereinafter described. The operator then turns the hand-wheel until finger 94 rests upon stud 82ᶜ. This closes an operating-circuit, which closes a clutch-circuit to energize the electric clutch mechanism for moving the damping-frames. The said operating-circuit consists of the following—namely, negative pole, switch 88, main-line wire 87, wire 86, parts 85 93 92 94, stud 82ᶜ, wire 122, electromagnet 123, wires 124 125, main-line wire 102 to positive pole. The closing of this operating-circuit through magnet 123 closes circuit-controller 126. This circuit-controller is the circuit-controller of the clutch-circuit through electric clutch mechanism 38 38ᵃ. This clutch-circuit consists of the following: from negative pole, switch 88, main-line wire 87, wire 127, studs and bridge on the circuit-controller 126, wire 128, electric clutch mechanism 38 38ᵃ, wire 129, studs and bridge on circuit-controller 126, wire 125, main-line wire 102, switch 88 to positive side. Similarly catch 130 seizes and holds circuit-controller 126 in its closed position. In this position clutch mechanism 38 38ᵃ is energized and causes gear-wheel 42 to rotate with shaft 6 and to drive a train of gearing connecting with the damping-frames of the press. The damping-frames are thus moved so as to bring the damping-rollers against the printing-cylinder and into operative position for damping the latter cylinders.
The operator then moves hand-wheel 89 until finger 94 rests upon the stud 82ᵈ. This closes an operating-circuit which closes a clutch-circuit through electric clutch mechanism 18 18ᵃ to move the inking-frames. The said operating-circuit consists of the following: negative pole, switch 88, main-line wire 87, wire 86, parts 85 93 92 94, stud 82ᵈ, wire 131, electromagnet 132, wires 133 134, main-line wire 102, switch 88 to positive side. When this circuit is closed, magnet 132 closes circuit-controller 135, thus closing the clutch-circuit through electric clutch mechanism 18 18ᵃ. This clutch-circuit consists of the following: negative pole, switch 88, main-line wire 87, wire 136, studs and bridge on circuit-controller 135, wire 137, electric clutch mechanism 18 18ᵃ, wire 138, studs and bridge on the circuit-controller 135, wire 134, main-line wire 102, switch 88 to positive side. Catch 139 holds circuit-controller 135 in its closed position. Thus electric clutch mechanism 18 18ᵃ is energized and causes gear-wheel 21 to rotate with the shaft and through its train of gearing to move the inking-frames throughout the press to bring the inking-rollers against the printing-cylinders.

When the various parts of the press to be moved—the printing-cylinders, the damping-frames, and the inking-frames—have all been moved into their operative positions ready for printing, the operator moves the hand-wheel, so as to bring finger 94 upon stud 82ᵉ. This closes a circuit through a magnet, which attracts and withdraws catch 113, permitting the circuit-controller 103 to drop backward into its open or inoperative position, thus deenergizing electric clutch mechanism 16 16$^a$ (A) and disconnecting gear-wheel 12 from shaft 6. Thereupon shaft 6 ceases to rotate and with it gear-wheels 66, 42, and 21 cease to rotate unless these gear-wheels have been sooner automatically stopped, as hereinafter described, thus stopping the movement of the printing-cylinders, damping-frames, and inking-frames throughout the press. This circuit, above referred to, I speak of as a "releasing-circuit," inasmuch as it releases the circuit-controller of one of the clutch-circuits. This releasing-circuit consists of the following parts—viz., negative pole, switch 88, main-line wire 87, wire 86, parts 85 93 92 94, stud 82$^e$, wire 140, electromagnet 141, wire 142, end of wire 109, studs and bridge of circuit-controller 103, (inasmuch as the circuit-controller is in its closed position,) wire 101, main-line wire 102, switch 88 to positive pole. As this releasing-circuit is thus closed by the operator electromagnet 141 attracts and withdraws catch 113, which is its armature-lever, withdrawing tooth 114 from contact with circuit-controller 103 and permitting the latter to fall back into its open or inoperative position, thus deënergizing electric clutch mechanism 16 16$^a$ (A) and causing shaft 6 to cease to rotate, as above described. In this position the respective parts of the press—the printing-cylinders, damping-frames, and inking-frames—are in their forward or operative position, where they are prepared to do the work of damping, inking, and printing.

When the operator desires to move these various parts of the press back to their original positions—as, for example, after the printing has been completed—he turns the hand-wheel until finger 94 rests upon stud 82$^f$. This closes an operating-circuit which closes a circuit-controller in a clutch-circuit through clutch mechanisms 16 16$^a$, (B,) thus energizing this electric clutch mechanism and causing shaft 6 to rotate with gear-wheel 12. Shaft 6 is thus driven in a direction reverse to the rotation first imparted to it. The above operating-circuit consists of the following parts: negative pole, switch 88, main-line wire 87, wire 86, parts 85 93 92 94, stud 82$^f$, wire 143, electromagnet 144, wire 145, wire 146, main-line wire 102, switch 88 to positive pole. Magnet 144 when thus energized closes circuit-controller 147, thus closing the clutch-circuit, which is as follows—namely, negative pole, switch 88, main-line wire 87, wire 148, studs and bridge of circuit-controller 147, wire 149, electric clutch mechanism 16 16$^a$, (B,) wire 150, studs and bridge of circuit-controller 147, wire 146, the main-line wire 102. Catch 151 seizes and holds circuit-controller 147 in its closed position until released, as hereinafter described. The operator then moves finger 94 upon stud 82$^g$, closing the operating-circuit through magnet 132, above described, thus closing circuit-controller 135 of the clutch-circuit through clutch mechanism 18 18$^a$, above described. This causes gear 21 to rotate with shaft 6, and through its train of gearing, above described, moves the inking-frames backward away from the printing-cylinders or into their inoperative positions. Catch 139 seizes and holds circuit-controller 135, thus insuring a continuance of this movement until its completion and discontinuance, as hereinafter described. The operator then moves the hand-wheel, bringing finger 94 into contact with stud 82$^h$, thus closing the operating-circuit through magnet 123, the latter closing circuit-controller 126 in the clutch-circuit through electric clutch mechanism 38 38$^a$. This connects gear-wheel 42 with shaft 6, and, through its respective train of gearing, moves the damping-frames throughout the press, causing them to move so as to take the damping-rollers away from the printing-cylinder. Catch 130 seizes and holds circuit-controller 126 until this movement is completed, as hereinafter described. The operator then moves the hand-wheel until finger 94 touches stud 82$^i$. This closes the operating-circuit through magnet 116, closing circuit-controller 118 to close the clutch-circuit through clutch mechanism 65 65$^a$. This connects gear-wheel 66 with shaft 6, and, through its appropriate train of gearing, gear-wheel 66 moves all the printing-cylinders of the press away from the impression-drum, catch 121 seizing and holding circuit-controller 118 in its closed position during this movement. The operator then moves the hand-wheel until finger 94 rests upon stud 82$^j$. This closes a releasing-circuit to withdraw catch 151 to permit circuit-controller 147 to open, thus breaking the clutch-circuit through clutch mechanism 16 16$^a$, (B.) This releasing-circuit consists of the following: negative pole, switch 88, line-wire 87, wire 86, parts 85 93 92 94, stud 82$^j$, wire 152, magnet 153, wire 154, end of wire 150, studs and bridge of circuit-controller 147, (inasmuch as the circuit-controller is closed,) wire 146, main-line wire 102. Thus energized, magnet 153 withdraws catch 151 from circuit-controller 147, thus breaking the clutch-circuit through 16 16$^a$ (B) and disconnecting shaft 6 from gear-wheel 12, whereupon shaft 6 ceases to rotate and with it gear-wheels 66, 42, and 21 cease to rotate.

In the above manner and by the above-described mechanism the operator, by turning his hand-wheel so that finger 94 makes successive contact with the different studs, first connects the shaft of the controlling-engine with the driving mechanism of the press, thus causing the shaft to be driven in one direction, and then successively closes the different operating-circuits, successively energizing the different electric clutch mechanisms controlling the movements of the printing-cylinders, damping-frames, and inking-frames in order until the printing-cylinders, damping-rollers, and inking-rollers have been moved into their operative or printing positions, whereupon the printing proceeds. When the printing is completed, the operator moves the hand-wheel, bringing finger 94 into contact successively with studs 82$^f$, 82$^g$, 82$^h$, 82$^i$, and 82$^j$, thus closing the different operating-circuits and through them the different clutch-circuits, causing the shaft of the controlling-engine to be so connected with the driving mechanism of the press as to rotate in a direction different from that of its first rotation and to connect that shaft with the different parts of the press to be moved with the damping-frames, inking-frames, and printing-cylinders, to cause them to be moved backward into their inoperative positions. When this movement is completed, the operator disconnects the shafts of the controlling-engine from its driving mechanism in the manner above described. The press is now at rest or at least is not printing. By these means the damping mechanism, inking mechanism, and the printing-surfaces are always moved into or out of operative position independently of the ordinary operation of the press and in a fixed predetermined sequence, and the damping mechanism is always brought into operative connection with the printing-surface before the inking mechanism is brought into operative connection with the said printing-surface, and the damping mechanism is always kept in such operative connection with the printing-surface until after the inking mechanism is moved out of operative connection with the printing-surface. By these means the operator is compelled to move the parts in a predetermined order or sequence, and mistakes on the part of operators are guarded against and injury to the parts of the press avoided.

In order to cause the printing-cylinders, damping-frames, and inking-frames to stop when they have reached the limits of their respective movements, either when moving into operative position or out of operative position, I preferably provide means for automatically shutting off the power for moving these various parts in order to prevent breakage of the parts of the press and to insure that the various parts thus moved shall stop at a predetermined point. My preferred mechanism for this purpose I will now describe. It consists, generally speaking, of means, automatically actuated by the part of the press being moved at the limit of its movement, for releasing the catch which holds the circuit-controller of the clutch-circuit corresponding to said part of the press, thus deënergizing the electric clutch mechanism which connects the shaft of the controlling-engine with the connecting mechanism leading to the said part of the press which is being moved. In this manner the power is shut off and the part of the press in question is automatically brought to a standstill. The means for accomplishing this purpose for each of the parts to be moved—namely, for the printing-cylinders, the damping-frames, and the inking-frames—is the same. It consists of an electromagnet in a releasing-circuit controlling the said catch and withdrawing it when a circuit-controller, which is also in the circuit and which is operated automatically by the part being moved at the limit of its movement, is operated by that part as it reaches the limit of its movement. Thus in the case of the printing-cylinders the said releasing-circuit consists of the following—namely, negative pole, switch 88, line-wire 87, wire 155, electromagnet 156, wire 157, having two branches 158 and 159, each provided with a contact-point 160 and 161, respectively, wire 162, secured to one of the segments 73, which moves the printing-cylinders toward or away from the impression-drum, as above described, wire 162 having two contact-points 163 and 164 adapted to make contact with the contact-points 160 and 161, respectively, one set of contact-points being brought together when segments 73 are at the limit of their movement in one direction, and the other set of contact-points being brought together when the segments are at the other limit of their movement, end of wire 120, studs and bridge of circuit-controller 118, main-line wire 102, switch 88 to positive pole. In this device contact-points 160, 161, 163, and 164 constitute a circuit-controller automatically operated by the segments 73 at the limit of their movement. As shown in the drawings, when the segments 73 are at either limit of their movement the circuit through electromagnet 156 is closed, that magnet is energized, and catch 121 is withdrawn from circuit-controller 118, releasing the latter and permitting it to break the clutch-circuit through electric clutch mechanism 65 65$^a$. This disconnects the shaft of the controlling-engine from gear-wheel 66 and the connecting mechanism leading to the printing-cylinders, thus causing those cylinders to immediately stop. This operation is automatic and needs no supervision on the part of the operator, is simple in its operation and certain in its action, and effectually prevents breaking of parts of the press, while at the same time stopping the printing-cylinders at a predetermined point with certainty and precision. In order to permit of the oscillatory movement of segment 73 without in any way interfering with the electrical connection, a part of wire 162 is made of a springy flexible character, as shown in Fig. 8. There is a similar releasing-circuit, electromagnet, and circuit-controller automatically operated by the damping-frames at the limit of their movement to automatically stop the movement of the damping-frames at a predetermined point for the purpose above described. This circuit consists of the following: negative pole, switch 88, main-line wire 87, wire 127, wire 165, electromagnet 166, wire 167, spring-arm 168, having contact-pin 169, projecting through near the end of arm 168 on both sides of the arm, contact-points 170 171, mounted on the insulation-disk 172, wires 173 174, uniting into wire 175, part of wire 129 and studs and bridge of circuit-controller 126, wire 125, line-wire 102 to positive pole. The end of wire 167 and spring-arm 168 are carried on oscillating arm 176, (see Fig. 10,) mounted on the same shaft 56 upon which is mounted eccentric 57, which oscillates wheel 58, which gives a reciprocating movement to the various damping-frames of the press. Accordingly as these damping-frames are moved one way or the other arm 176 closes the circuit through magnet 166, either between contact-points 169 and 170 at one limit of the movement of the damping-frames or at contact-points 169 171 at the limit of the movement in the other way. In either case magnet 166 is energized, catch 130 is withdrawn, and circuit-controller 126 is opened, deënergizing electric clutch mechanisms 38 38$^a$, and thus disconnecting the shaft of the controlling-engine from gear-wheel 42 and the connecting mechanism leading to and operating the damping-frames, causing those damping-frames to stop their movement at once. A similar circuit, electromagnet, and circuit-controller are automatically actuated by the movement of the inking-frames at the limits of their movements. This circuit and connections consist of the following: negative pole, switch 88, main-line wire 87, wire 136, wire 177, electromagnet 178, wire 179, swinging arm 180, carrying the end of wire 179, spring 181 upon arm 180 and electrically connected with wire 179, contact-point 182, projecting on both sides of spring 181, contact-points 183 184, wire 185 186, uniting into wire 187, end of wire 138, studs and bridge of circuit-controller 135, wire 134, main-line wire 102 to positive pole. Arm 180 and its connections may be placed upon any one of the different sets of inking-frames in the press. As the inking-frames move one way or the other arm 180 moves with them, making contact-points 182 183 to close the circuit through magnet 178 when the inking-frames are at one limit of their movement, and making contact-points 182 and 184 make contact and close the circuit through the magnet when the inking-frames are at the limit of their movement in the other direction, in both cases withdrawing catch 139 from circuit-controller 135 and causing the latter to fall back and break the circuit through electric clutch mechanism 18 18$^a$. This disconnects gear-wheel 21 and the connecting mechanism leading from it to and operating the inking-frames to the shaft from the controlling-engine, thus immediately stopping the inking-frames in their movement. While the operator by closing the circuits through releasing-magnet 141 or 153 can disconnect the shaft of the controlling-engine from the driving mechanism which is imparting motion to it, and thus can at will stop the movements of the different parts of the press, the above automatic means guards against any negligence on the part of the operator and insures the stoppage of each different part of the press being moved exactly at a predetermined point. It is evident, of course, that in place of the electric circuits employed in this automatic releasing mechanism mechanical means automatically actuated by the different parts of the press being moved could be substituted in its place without departing from my invention. I prefer, however, the arrangement herein shown and described for this purpose. In Figs. 14, 15, 16, and 17 I have shown a form of magnets and connections which I prefer to use, although any other suitable form may of course be employed. The moment circuit-controller 118 or 126 or 135 closes its releasing-magnet will be instantly energized, inasmuch as contact-points 160 163 or 169 and 170 or 182 and 183 are then in contact with each other. This would prevent catch 121 or 130 or 139 from seizing and holding its corresponding circuit-controller. In order to overcome this, it is necessary for the operator to keep the contact between finger 94 and the different studs closed for a sufficient length of time to start the movement of the corresponding part of the press, and thus break the contact between the contact-points referred to. The moment this contact is broken the catch at once becomes operative.

Figs. 18, 19, 20, and 21 show a box 188, in which I place the different circuit-controllers and their catches, electromagnets, and connections. The bottom of the box 189 is made of wood or other suitable insulating material. The ends 190 190 are made, preferably, of slate. Over the wooden bottom I preferably place a layer of slate 191. The sides of the box 192 192 are made of glass, so as to show the contents of the box and the position of the different circuit-controllers. In order to make the latter more clearly visible, I preferably place incandescent lamps 193 in the interior of the box to light up the same. 194 is a base or platform containing the circuit-controller 118, catch 121, electromagnets 116 156, and their respective contact-points, bridges, and wire connections. 195, 196, 197, and 198 are similar platforms containing, respectively, circuit-controllers 147, 103, 126, and 135 and their respective magnets, catches, and other connections. Figs. 18 and 19 also show various binding-posts used in the system, which may of course be of any form or arrangement desired and will therefore not be further explained.

Figs. 14 to 17, inclusive, show the preferred form of platform, circuit-controller, catch, electromagnets, contact-points, and wire connections preferably employed by me. 199 represents a circuit-controller having a head 200, composed of insulating material and carrying bridges 201. The circuit-controller is normally held outward, as shown in Fig. 14, by means of spring 202. Circuit-controller 199 is an armature-lever carrying armature 203 of electromagnet 204. This is the electromagnet of the operating-circuit and controls the circuit-controller 199, which corresponds with the circuit-controller of the clutch-circuits above described. The catch of the circuit-controller is represented in these figures by spring-controlled arm 205, which is normally held in its upward position by means of spring 206. Catch 205 passes through a slot 207 in circuit-controller 199 and has a toe 208, which slips behind and holds circuit-controller 199 when pulled forward by the magnet 204. When this is pulled forward, bridges 201 make contact with contact-points 209. The faces of bridges 201 are preferably made wedge-shaped, and the ends of contact-points 209 are made of the shape shown in Fig. 14, in order that a close contact may be made and maintained at all times between the bridges and the contact-points. Catch 205 is the armature-lever of armature 210 of electromagnet 211. Magnet 211 corresponds with the releasing-magnets 156, 153, 141, 166, and 178. The operation of these parts has already been sufficiently described.

In the form of controlling-engine shown in the drawings the driving mechanism of the controlling-engine consists of shaft 6 or 6ᵃ 6ᵇ and its connections. The source of power for the controlling-engine is the driving mechanism of the press, acting through shaft 10 and its connections, the two said driving mechanisms forming the driving mechanism for moving the different parts of the press. The connecting mechanism between the driving mechanism of the controlling-engine and the damping-frames consists of the train of gearing comprising gear 42 and 43, shaft 44, and the other gearing connecting said shaft 44 with the damping-frames. The connecting mechanism between the driving mechanism of the controlling-engine and the inking-frames consists of the train of gearing comprising gear 21 22, shaft 23, and the other gearing connecting said shaft 23 with the ink-frames. The connecting mechanism between the driving mechanism of the controlling-engine and the printing-surfaces consists of the train of gearing comprising gear-wheel 66 67, shaft 68, and the other gearing connecting said shaft with the printing-surfaces. The clutch mechanism to connect the source of power—the driving mechanism of the press—with the driving mechanism of the controlling-engine consists of the two clutch gear-wheels 12 and 12 and electric clutches 16 16ᵃ. The clutch mechanism to connect the driving mechanism of the controlling-engine with the connecting mechanism leading to the damping-frames consists of the gear-wheel 42 and electric clutch 38 38ᵃ. Similarly the clutch mechanism to connect the driving mechanism of the controlling-engine with the connecting mechanism leading to the inking mechanisms consists of gear-wheel 21 and electric clutch 18 18ᵃ; and the clutch mechanism to connect the said driving mechanism with the connecting mechanism leading to the printing-surfaces consists of gear-wheel 66 and electric clutch 65 65ᵃ.

In the drawings in this case my controlling-engine has been shown as controlling the movements of the printing, inking, and damping devices only; but it can of course be applied to control the movements of any other part of the press which it may be desired to move.

The driving mechanism of my controlling-engine may be driven from any suitable source of power, although I prefer to drive it, as shown in the drawings, by the driving mechanism of the press.

In the preferred form of my improved device, as shown, the connecting mechanisms intervening between the driving mechanism of the controlling-engine and the different parts of the press are shown as consisting of trains of gearing. Such connecting mechanisms may, however, consist of any other form of mechanism suitable for the purpose. Likewise the means for operating the clutch mechanisms may be varied from those shown in the drawings.

My improved devices are simple in character, compact in form, and are easily operated. By means of them the movements of different parts of the press are easily and quickly controlled, and the operator is enabled to maintain at all times complete and ready control of such movements to move such parts to any desired position with certainty and precision and to time such movements with exactness.

This application is designated as "Case A" to distinguish it from two other applications for controlling-engines filed by me simultaneously herewith and designated as "Case B" and "Case C."

What I claim as new, and desire to secure by Letters Patent, is—

1. In a controlling-engine for a press, a shaft adapted to rotate in either direction, means for rotating it in either direction, mechanism connecting with a part of the press to be moved, a gear-wheel arranged and adapted to connect or disconnect the shaft with said connecting mechanism, whereby the shaft, when connected to the connecting mechanism, will drive the latter to move the said part of the press, electric clutch mechanism adapted to cause the gear-wheel to connect the shaft with the said connecting mechanism or to disconnect them, a clutch-circuit through said electric clutch mechanism, a circuit-controller therein for making or breaking the circuit, an operating-circuit, an electromagnet therein controlling the circuit-controller of the clutch-circuit, and a circuit-controller in the operating-circuit under the control of the operator, whereby the operation of the said part of the press may be controlled.

2. In a controlling-engine for a press, a shaft adapted to rotate in either direction, means for rotating it in either direction, mechanism connecting with a part of the press to be moved, a gear-wheel arranged and adapted to connect or disconnect the shaft with said connecting mechanism, whereby the shaft, when connected to the connecting mechanism, will drive the latter to move the said part of the press, electric clutch mechanism adapted to cause the gear-wheel to connect the shaft with the said connecting mechanism or to disconnect them, a clutch-circuit through said electric clutch mechanism, a circuit-controller therein for making or breaking the circuit, an operating-circuit, an electromagnet therein controlling the circuit-controller of the clutch-circuit, and a circuit-controller in the operating-circuit under the control of the operator, a catch for holding the circuit-controller of the clutch-circuit in its operative position, an electromagnet in a releasing-circuit for withdrawing the catch, and a circuit-controller in the said releasing-circuit, whereby the operation of the said parts of the press may be controlled.

3. In a controlling-engine for a press, a shaft adapted to rotate in either direction, driving mechanism for rotating said shaft, two clutch gear-wheels intermediate between said driving mechanism and the shaft, capable of connecting or disconnecting the said driving mechanism with the said shaft and of driving said shaft in one direction when one gear-wheel connects the driving mechanism with the shaft, and of driving the shaft in the other direction when the other gear-wheel connects them together, electric clutch mechanism adapted to cause one or the other of the said gear-wheels to connect the said driving mechanism with the said shaft or to cause both of them to disconnect the driving mechanism from the shaft, a circuit through the said electric clutch mechanism, a circuit-controller therein, under the control of the operator, for making and breaking said circuit at will, and for thereby operating the said clutch mechanism whereby the shaft may be driven in either direction at will, mechanism connecting with a part of the press to be moved, a gear-wheel arranged and adapted to connect or disconnect the shaft with said connecting mechanism, whereby the shaft, when connected to the connecting mechanism, will drive the connecting mechanism to move the said part of the press, electric clutch mechanism adapted to cause the gear-wheel to connect the shaft with the said connecting mechanism or to disconnect them, a clutch-circuit through said electric clutch mechanism, a circuit-controller therein, an operating-circuit containing an electromagnet controlling the circuit-controller of the clutch-circuit, and a circuit-controller in the said operating-circuit, under the control of the operator, for making and breaking said circuit at will, whereby the operation of the said part of the press may be controlled.

4. In a controlling-engine for a press, a shaft adapted to rotate in either direction, driving mechanism for rotating said shaft, two clutch gear-wheels intermediate between said driving mechanism and the shaft, capable of connecting or disconnecting the said driving mechanism with the said shaft and of driving said shaft in one direction when one gear-wheel connects the driving mechanism with the shaft, and of driving the shaft in the other direction when the other gear-wheel connects them together, electric clutch mechanism adapted to cause one or the other of the said gear-wheels to connect the said driving mechanism with the said shaft or to cause both of them to disconnect the driving mechanism from the shaft, a circuit through the said electric clutch mechanism, a circuit-controller therein, under the control of the operator, for making and breaking said circuit at will, and for thereby operating the said clutch mechanism whereby the shaft may be driven in either direction at will, mechanism connecting with a part of the press to be moved, a gear-wheel arranged and adapted to connect or disconnect the shaft with said connecting mechanism whereby the shaft, when connected to the connecting mechanism, will drive the connecting mechanism to move the said part of the press, electric clutch mechanism adapted to cause the gear-wheel to connect the shaft with the said connecting mechanism or to disconnect them, a clutch-circuit through said electric clutch mechanism, a circuit-controller therein, an operating-circuit containing an electromagnet controlling the circuit-controller of the clutch-circuit, and a circuit-controller in the said operating-circuit, under the control of the operator, for making and breaking said circuit at will, a catch for holding the circuit-controller of the clutch-circuit in its operative position, and means for releasing the catch, whereby the operation of the said part of the press may be controlled.

5. In a controlling-engine for a press, a shaft adapted to rotate in either direction, driving mechanism for rotating said shaft, two clutch gear-wheels intermediate between said driving mechanism and the shaft, capable of connecting or disconnecting the said driving mechanism with the said shaft and of driving said shaft in one direction when one gear-wheel connects the driving mechanism with the shaft, and of driving the shaft in the other direction when the other gear-wheel connects them together, electric clutch mechanism adapted to cause one or the other of the said gear-wheels to connect the said driving mechanism with the said shaft or to cause both of them to disconnect the driving mechanism from the shaft, a circuit through the said electric clutch mechanism, a circuit-controller therein, under the control of the operator, for making and breaking said circuit at will, and for thereby operating the said clutch mechanism whereby the shaft may be driven in either direction at will, mechanism connecting with a part of the press to be moved, a gear-wheel arranged and adapted to connect or disconnect the shaft with said connecting mechanism whereby the shaft, when connected to the connecting mechanism, will drive the connecting mechanism to move the said part of the press, electric clutch mechanism adapted to cause the gear-wheel to connect the shaft with the said connecting mechanism or to disconnect them, a clutch-circuit through said electric clutch mechanism, a circuit-controller therein, an operating-circuit containing an electromagnet controlling the circuit-controller of the clutch-circuit, and a circuit-controller in the said operating-circuit under the control of the operator for making and breaking said circuit at will, a catch for holding the circuit-controller of the clutch-circuit in its operative position, a releasing-circuit, an electromagnet therein for controlling the catch, and a circuit-controller in said releasing-circuit automatically actuated by the said part of the press as it reaches the limit of its movement, whereby the controlling-engine may be started and stopped by the operator at will, and whereby the movement of the said part of the press may be controlled and will be automatically stopped when the part of the press reaches the limit of its movement.

6. In a press, a shaft adapted to rotate in either direction, driving mechanism for rotating said shaft, two clutch gear-wheels intermediate between said driving mechanism and the shaft, capable of connecting or disconnecting the said driving mechanism with the said shaft, and of driving the said shaft in one direction when one gear-wheel connects the driving mechanism of the shaft, and of driving the shaft in the other direction when the other gear-wheel connects them, electric clutch mechanisms adapted to cause one or the other of the said gear-wheels to connect the driving mechanism with the said shaft or to cause both of them to disconnect the driving mechanism from the shaft, clutch-circuits through said electric clutch mechanisms, circuit-controllers in said clutch-circuits for making or breaking said circuits, an operating-circuit for each of said clutch-circuits, an electromagnet in each operating-circuit controlling the circuit-controller in its corresponding clutch-circuit, and a circuit-controller in each operating-circuit, under the control of the operator, whereby the operation of the said parts of the press may be controlled.

7. In a press, a shaft adapted to rotate in either direction, driving mechanism for rotating said shaft, two clutch gear-wheels intermediate between said driving mechanism and the shaft, capable of connecting or disconnecting the said driving mechanism with the said shaft, and of driving the said shaft in one direction when one gear-wheel connects the driving mechanism of the shaft, and of driving the shaft in the other direction when the other gear-wheel connects them, electric clutch mechanisms adapted to cause one or the other of the said gear-wheels to connect the driving mechanism with the said shaft or to cause both of them to disconnect the driving mechanism from the shaft, clutch-circuits through said electric clutch mechanisms, circuit-controllers in said clutch-circuits for making or breaking said circuits, an operating-circuit for each of said clutch-circuits, an electromagnet in each operating-circuit controlling the circuit-controller in its corresponding clutch-circuit, and a circuit-controller in each operating-circuit, under the control of the operator, a catch for the circuit-controller in each clutch-circuit for holding said circuit-controller in its operative position, a releasing-circuit for each catch, an electromagnet in each releasing-circuit adapted to withdraw the said catch, and a circuit-controller in each releasing-circuit automatically actuated by one of the said parts of the press to be moved, whereby the operation of different parts of the press may be controlled and the movements of the said parts of the press will be automatically stopped at a predetermined point.

8. In a controlling-engine for a press, a shaft adapted to rotate in either direction, means for rotating it in either direction driven by the driving mechanism of the press, a series of connecting mechanisms connecting with different parts of the press to be moved, a gear-wheel intermediate between said shaft and each connecting mechanism capable of connecting or disconnecting the shaft with said connecting mechanism, whereby when connected to the shaft the said connecting mechanism will be driven in one way or the other, as the shaft is revolved in one direction or the other, and when disconnected the connecting mechanism will remain at rest, electric clutch mechanism for each connecting mechanism, adapted to connect or disconnect the shaft to said connecting mechanism through said gear-wheel, a clutch-circuit through each clutch mechanism, a circuit-controller therein, an operating-circuit for each clutch-circuit, an electromagnet in each operating-circuit adapted to control the circuit-controller of its corresponding clutch-circuit, and a circuit-controller in each operating-circuit under the control of the operator, whereby the operation of the said parts of the press may be controlled.

9. In a controlling-engine for a press, a shaft adapted to rotate in either direction, means for rotating it in either direction driven by the driving mechanism of the press, a series of connecting mechanisms connecting with different parts of the press to be moved, a gear-wheel intermediate between said shaft and each connecting mechanism capable of connecting or disconnecting the shaft with said connecting mechanism, whereby when connected to the shaft the said connecting mechanism will be driven in one way or the other, as the shaft is revolved in one direction or the other, and when disconnected the connecting mechanism will remain at rest, electric clutch mechanism for each connecting mechanism, adapted to connect or disconnect the shaft to said connecting mechanism through said gear-wheel, a clutch-circuit through each clutch mechanism, a circuit-controller therein, an operating-circuit for each clutch-circuit, an electromagnet in each operating-circuit adapted to control the circuit-controller of its corresponding clutch-circuit, and a circuit-controller in each operating-circuit under the control of the operator, a catch for holding the circuit-controller of each clutch-circuit in its operative position, a releasing-circuit for each catch, an electromagnet in each releasing-circuit adapted to withdraw the catch and a circuit-controller in each releasing-circuit automatically controlled by one of the said parts of the press to be moved when it reaches the limit of its movement, whereby the operation of the said parts of the press may be controlled, and the movement of each part of the press to be moved will be automatically stopped at a predetermined point.

10. In a controlling-engine for a press, a shaft adapted to rotate in either direction, driving mechanism, driven by the driving mechanism of the press, for rotating said shaft, two clutch gear-wheels intermediate between said driving mechanism of the controlling-engine and the shaft capable of connecting or disconnecting the said driving mechanism with the shaft and of driving the said shaft in one direction when one gear-wheel connects the driving mechanism to the shaft, and of driving the shaft in the other direction when the other gear-wheel connects them together, electric clutch mechanisms adapted to cause one or the other of the said gear-wheels to connect the driving mechanism to the shaft or to cause both of them to disconnect the two, a clutch-circuit through each of said clutch mechanisms, a circuit-controller in each clutch-circuit, an operating-circuit for each of said clutch-circuits, an electromagnet in each operating-circuit adapted to control the circuit-controller of the corresponding clutch-circuit, a circuit-controller in each operating-circuit under the control of the operator, a series of connecting mechanisms connecting with different parts of the press to be moved, a gear-wheel intermediate between said shaft and each of said connecting mechanisms and capable of connecting or disconnecting the shaft with said connecting mechanism, whereby, when connected to the shaft, the connecting mechanism will be driven in one direction or the other as the shaft rotates one way or the other, and when disconnected the connecting mechanism will remain at rest, electric clutch mechanism for connecting or disconnecting the said shaft with each of said connecting mechanisms, a clutch-circuit through each of said clutch mechanisms, a circuit-controller in each of said clutch-circuits, an operating-circuit for each clutch-circuit, an electromagnet in each operating-circuit adapted to control the circuit-controller of the corresponding clutch-circuit, and a circuit-controller in each operating-circuit under the control of the operator, whereby the operation of the different parts of the press may be controlled.

11. In a controlling-engine for a press, a shaft adapted to rotate in either direction, driving mechanism, driven by the driving mechanism of the press, for rotating said shaft, two clutch gear-wheels intermediate between said driving mechanism of the controlling-engine and the shaft capable of connecting or disconnecting the said driving mechanism with the shaft and of driving the said shaft in one direction when one gear-wheel connects the driving mechanism of the shaft, and of driving the shaft in the other direction when the other gear-wheel connects them together, electric clutch mechanisms adapted to cause one or the other of the said gear-wheels to connect the driving mechanism with the shaft or to cause both of them to disconnect the two, a clutch-circuit through each of said clutch mechanisms, a circuit-controller in each clutch-circuit, an operating-circuit for each of said clutch-circuits, an electromagnet in each operating-circuit adapted to control the circuit-controller of the corresponding clutch-circuit, a circuit-controller in each operating-circuit under the control of the operator, a series of connecting mechanisms connecting with different parts of the press to be moved, a gear-wheel intermediate between said shaft and each of said connecting mechanisms and capable of connecting or disconnecting the shaft with said connecting mechanism, whereby, when connected to the shaft, the connecting mechanism will be driven in one direction or the other as the shaft rotates one way or the other, and when disconnected the connecting mechanism will remain at rest, electric clutch mechanism for connecting or disconnecting the said shaft with each of said connecting mechanisms, a clutch-circuit through each of said clutch mechanisms, a circuit-controller in each of said clutch-circuits, an operating-circuit for each clutch-circuit, an electromagnet in each operating-circuit adapted to control the circuit-controller of the corresponding clutch-circuit, a circuit-controller in each operating-circuit under the control of the operator, a catch for the circuit-controller of each clutch-circuit adapted to hold the said circuit-controller in operative position, a releasing-circuit for each catch, an electromagnet in each releasing-circuit adapted to withdraw the catch, and a circuit-controller in each releasing-circuit automatically actuated by one of the parts of the press to be moved at the limit of its movement, whereby the operation of the different parts of the press may be controlled and the movement of the said parts of the press may be automatically stopped at a predetermined point.

12. The combination in a press of a part of the press to be moved, driving mechanism, driven by the driving mechanism of the press, for moving said part of the press, connecting mechanism between the driving mechanism and the part of the press to be moved, adapted to connect or disconnect the said driving mechanism to the said part of the press, whereby when the driving mechanism and the said part of the press are thus connected, motion will be imparted from the driving mechanism to the said part of the press to move the latter, electric clutch mechanism arranged and adapted to cause the said connecting mechanism to connect the driving mechanism with the said part of the press or to disconnect them, a clutch-circuit through the said electric clutch mechanism, a circuit-controller therein, an operating-circuit, an electromagnet therein adapted to control the circuit-controller of the clutch-circuit, and a circuit-controller in the operating-circuit, under the control of the operator, for making and breaking said circuit at will, and thereby operating the clutch mechanism, whereby the operation of the said part of the press may be controlled.

13. The combination in a press, of a series of parts of the press to be moved, driving mechanism, driven by the driving mechanism of the press, for moving said parts of the press, connecting mechanism between the driving mechanism and each of the said parts of the press adapted to connect or disconnect the said driving mechanism with the said parts of the press, whereby, when such connection is made between the driving mechanism and any of the said parts of the press, motion will be imparted from the driving mechanism to the said part or parts of the press, electric clutch mechanism for each of said parts of the press arranged and adapted to cause the connecting mechanism connecting with the said part of the press to connect the driving mechanism to the said part of the press and to disconnect them, a clutch-circuit through each clutch mechanism, a circuit-controller in each clutch-circuit, an operating-circuit for each clutch-circuit, an electromagnet in each operating-circuit adapted to control the circuit-controller of the corresponding clutch-circuit, and a circuit-controller in each operating-circuit, under the control of the operator, whereby the operation of the said parts of the press may be separately controlled.

14. In a controlling-engine for a press, a shaft, means for rotating said shaft, driven by the driving mechanism of the press, mechanism connecting with a part of the press to be moved, a gear-wheel arranged and adapted to connect or disconnect the shaft with said connecting mechanism whereby the shaft, when connected to the connecting mechanism, will drive the connecting mechanism and move the said part of the press, electric clutch mechanism adapted to cause the gear-wheel to connect the shaft with the said connecting mechanism or to disconnect them, a clutch-circuit through the said electric clutch mechanism, a circuit-controller therein, an operating-circuit, an electromagnet therein adapted to control the circuit-controller of the clutch-circuit, and a circuit-controller in the operating-circuit, under the control of the operator, for making and breaking said circuit at will, and thereby operating the clutch mechanism, whereby the operation of the said part of the press may be controlled.

15. The combination in a press of a part of the press to be moved, driving mechanism, driven by the driving mechanism of the press, for moving said part of the press, connecting mechanism between the driving mechanism and the part of the press to be moved, adapted to connect or disconnect the said driving mechanism to the said part of the press, whereby when the driving mechanism and the said part of the press are thus connected, motion will be imparted from the driving mechanism to the said part of the press to move the latter, electric clutch mechanism arranged and adapted to cause the said connecting mechanism to connect the driving mechanism with the said part of the press or to disconnect them, a clutch-circuit through the said electric clutch mechanism, a circuit-controller therein, an operating-circuit, an electromagnet therein adapted to control the circuit-controller of the clutch-circuit, and a circuit-controller in the operating-circuit, under the control of the operator, for making and breaking said circuit at will, and thereby operating the clutch mechanism, a catch for holding the circuit-controller of the clutch-circuit in its operative position, a releasing-circuit, an electromagnet therein adapted to withdraw the catch, and a circuit-controller automatically actuated by the part of the press to be moved at the limit of its movement, whereby the operation of the said part of the press may be controlled and the movement of the said part of the press will be automatically stopped at a predetermined point.

16. The combination in a press, of a series of parts of the press to be moved, driving mechanism, driven by the driving mechanism of the press, for moving said parts of the press, connecting mechanism between the driving mechanism and each of the said parts of the press adapted to connect or disconnect the said driving mechanism with the said parts of the press, whereby, when such connection is made between the driving mechanism and any of the said parts of the press, motion will be imparted from the driving mechanism to the said part or parts of the press, electric clutch mechanism for each of said parts of the press arranged and adapted to cause the connecting mechanism, connecting with the said part of the press, to connect the driving mechanism to the said part of the press and to disconnect them, a clutch-circuit through each clutch mechanism, a circuit-controller in each clutch-circuit, an operating-circuit for each clutch-circuit, an electromagnet in each operating-circuit adapted to control the circuit-controller of the corresponding clutch-circuit, and a circuit-controller in each operating-circuit, under the control of the operator, a catch for the circuit-controller of each clutch-circuit, a releasing-circuit for each catch, an electromagnet in each releasing-circuit adapted to withdraw the said catch, and a circuit-controller in each releasing-circuit automatically actuated by a part of the press to be moved at the limit of its movement, whereby the operation of the different parts of the press may be controlled and the movements of the said parts of the press will be stopped at predetermined points.

17. In a controlling-engine for a press, a shaft, means for rotating said shaft, driven by the driving mechanism of the press, mechanism connecting with a part of the press to be moved, a gear-wheel arranged and adapted to connect or disconnect the shaft with said connecting mechanism, whereby the shaft, when connected to the connecting mechanism, will drive the connecting mechanism and move the said part of the press, electric clutch mechanism adapted to cause the gear-wheel to connect the shaft with the said connecting mechanism or to disconnect them, a clutch-circuit through the said electric clutch mechanism, a circuit-controller therein, an operating-circuit, an electromagnet therein adapted to control the circuit-controller of the clutch-circuit, and a circuit-controller in the operating-circuit, under the control of the operator, for making and breaking said circuit at will, and thereby operating the clutch mechanism, a catch for holding the circuit-controller of the clutch-circuit in its operative position, a releasing-circuit, an electromagnet therein adapted to withdraw the catch, and a circuit-controller automatically actuated by the part of the press to be moved at the limit of its movement, whereby the operation of the said part of the press may be controlled and the movement of the said part of the press will be automatically stopped at a predetermined point.

18. In a controlling-engine for a press, the combination with different parts of the press to be moved, of a shaft adapted to be rotated in either direction, means, operated by the driving mechanism of the press, for rotating said shaft in either direction, connecting mechanisms between the shaft and the different parts of the press to be moved, a gear-wheel and electric clutch intermediate between the shaft and each connecting mechanism, adapted, when the gear-wheel connects the shaft with the connecting mechanism, to drive the latter and move a part of the press one way or the other as the shaft is rotated one way or the other, and, when the gear-wheel disconnects the shaft and the connecting mechanism, to permit the connecting mechanism and the said part of the press to remain at rest, a series of clutch-circuits, one for each clutch, each having a circuit-controller therein, a series of operating-circuits, one for each clutch-circuit, each operating-circuit having an electromagnet controlling the circuit-controller of the clutch-circuit, and having also a circuit-controller under the control of the operator, a catch for the circuit-controller of each clutch-circuit to hold the said circuit-controller in its closed position, a series of releasing-circuits, one for each catch, each releasing-circuit containing an electromagnet adapted, when energized, to withdraw the catch to permit the circuit-controller of the clutch-circuit to open, and a circuit-controller, automatically closed, to energize said electromagnet and withdraw the catch, by the said part of the press when it reaches the limit of its movement.

19. In a controlling-engine for a press, the combination of electric clutch mechanism for connecting driving parts with a part to be driven or for disconnecting them, a circuit through said electric clutch mechanism adapted to cause it to connect the said parts together or to disconnect them, a circuit-controller therein for making or breaking said clutch-circuit, an electromagnet in another circuit arranged and adapted to control the operation of the said circuit-controller in the clutch-circuit, a circuit through said electromagnet and a circuit-controller therein for making and breaking said operating-circuit, whereby the clutch mechanism may be operated to cause it to connect the said driving parts with the said part to be driven or to disconnect them.

20. In a controlling-engine for a press, the combination of electric clutch mechanism for connecting driving parts with a part to be driven or for disconnecting them, a circuit through the said electric clutch mechanism adapted to cause it to connect the said parts together or to disconnect them, and a circuit-controller therein for making or breaking said clutch-circuit, an electromagnet in another circuit arranged and adapted to control the operation of the said circuit-controller in the clutch-circuit, a circuit through said electromagnet and a circuit-controller therein, under the control of the operator, for making and breaking said operating-circuit, whereby the clutch mechanism may be operated to cause it to connect the said driving parts with the said part to be driven or to disconnect them.

21. In a controlling-engine for a press, the combination of electric clutch mechanism for connecting driving parts with a part to be driven or for disconnecting them, a circuit through said electric clutch mechanism adapted to cause it to connect the said parts together or to disconnect them, a circuit-controller therein for making or breaking said clutch-circuit, a catch for seizing and holding said circuit-controller in its operative position to cause the clutch-circuit to operate the clutch, an electromagnet in another circuit arranged and adapted to control the operation of the circuit-controller in the clutch-circuit, a circuit through said electromagnet and a circuit-controller therein for making and breaking said operating-circuit, and means for releasing the catch to permit the circuit-controller of the clutch-circuit to resume its inoperative position, whereby the clutch mechanism may be operated to cause it to connect the said driving parts with the said part to be driven or to disconnect them.

22. In a controlling-engine for a press, the combination of electric clutch mechanism for connecting driving parts with a part to be driven or for disconnecting them, a circuit through said electric clutch mechanism adapted to cause it to connect the said parts together or to disconnect them, a circuit-controller therein for making or breaking said clutch-circuit, a catch for seizing and holding said circuit-controller in its operative position to cause the clutch-circuit to operate the clutch, an electromagnet in another circuit arranged and adapted to control the operation of the circuit-controller in the clutch-circuit, a circuit through said electromagnet and a circuit-controller therein for making and breaking said operating-circuit, and means, under the control of the operator, for releasing the catch to permit the circuit-controller of the clutch-circuit to resume its inoperative position, whereby the clutch mechanism may be operated to cause it to connect the said driving parts with the said part to be driven or to disconnect them.

23. In a controlling-engine for a press, the combination of electric clutch mechanism for connecting driving parts with a part to be driven or for disconnecting them, a circuit through said electric clutch mechanism adapted to cause it to connect the said parts together or to disconnect them, a circuit-controller therein for making or breaking said clutch-circuit, a catch for seizing and holding said circuit-controller in its operative position to cause the clutch-circuit to operate the clutch, an electromagnet in another circuit arranged and adapted to control the operation of the circuit-controller in the clutch-circuit, a circuit through said electromagnet and a circuit-controller therein for making and breaking said operative circuit, and means, automatically actuated by the part to be driven at the limit of its movement, for releasing the catch to permit the circuit-controller of the clutch-circuit to resume its inoperative position, whereby the clutch mechanism may be operated to cause it to connect the said driving parts with the said part to be driven, or to disconnect them.

24. In a controlling-engine for a press, the combination of electric clutch mechanism for connecting driving parts with a part to be driven or for disconnecting them, a circuit through said electric clutch mechanism adapted to cause it to connect the said parts together or to disconnect them, and a circuit-controller therein for making or breaking said clutch-circuit, a catch for seizing and holding said circuit-controller in its operative position to cause the clutch-circuit to operate the clutch, an electromagnet in another circuit arranged and adapted to control the operation of the circuit-controller in the clutch-circuit, a circuit through said electromagnet and a circuit-controller therein for making and breaking said operating-circuit, an electromagnet in a releasing-circuit arranged and adapted to withdraw the catch to permit the circuit-controller of the clutch-circuit to resume its inoperative position, a circuit through said last-mentioned electromagnet and a circuit-controller therein for making and breaking said releasing-circuit, whereby the clutch mechanism may be operated to cause it to connect the said driving parts with the said part to be driven or to disconnect them.

25. In a controlling-engine for a press, the combination of electric clutch mechanism for connecting driving parts with a part to be driven or for disconnecting them, a circuit through said electric clutch mechanism adapted to cause it to connect the said parts together or to disconnect them, a circuit-controller therein under the control of the operator, for making or breaking said clutch-circuit, a catch for seizing and holding said circuit-controller in its operative position to cause the clutch-circuit to operate the clutch, an electromagnet in another circuit arranged and adapted to control the operation of the circuit-controller in the clutch-circuit, a circuit through said electromagnet and a circuit-controller therein for making and breaking said operating-circuit, an electromagnet in a releasing-circuit arranged and adapted to withdraw the catch to permit the circuit-controller of the clutch-circuit to resume its inoperative position, a circuit through said last-mentioned electromagnet and a circuit-controller therein, under the control of the operator, for making and breaking said releasing-circuit, whereby the clutch mechanism may be operated to cause it to connect the said driving parts with the said part to be driven or to disconnect them.

26. In a controlling-engine for a press, the combination of electric clutch mechanism for connecting driving parts with a part to be driven or for disconnecting them, a circuit through said electric clutch mechanism adapted to cause it to connect the said parts together or to disconnect them, and a circuit-controller therein for making or breaking said clutch-circuit, a catch for seizing and holding said circuit-controller in its operative position to cause the clutch-circuit to operate the clutch, an electromagnet in another circuit arranged and adapted to control the operation of the circuit-controller in the clutch-circuit, a circuit through said electromagnet and a circuit-controller therein for making and breaking said operating-circuit, an electromagnet in a releasing-circuit arranged and adapted to withdraw the catch to permit the circuit-controller of the clutch-circuit to resume its inoperative position, a circuit through said last-mentioned electromagnet and a circuit-controller therein, automatically operated by the part to be driven at the limit of its movement to cause the releasing-magnet to release the catch, whereby the clutch mechanism may be operated to cause it to connect the said driving parts with the said part to be driven or to disconnect them.

27. In a controlling-engine for a press, the combination of electric clutch mechanism for connecting driving parts with a part to be driven or for disconnecting them, a circuit through said electric clutch mechanism normally open and adapted to cause the clutch mechanism to connect the said parts together or to disconnect them, a circuit-controller therein, normally open, for making and breaking said clutch-circuit, an electromagnet, normally deënergized in another circuit, arranged and adapted to control the operation of the said circuit-controller in the clutch-circuit, a circuit through said electromagnet, normally open, and a circuit-controller therein, also normally open, for making and breaking said operating-circuit, whereby upon the closing of the operating-circuit the clutch mechanism will connect said driving parts with the part to be driven, and when the operating-circuit is opened it will disconnect them.

28. In a controlling-engine for a press, the combination of electric clutch mechanism for connecting driving parts with a part to be driven or for disconnecting them, a circuit through the said electric clutch mechanism, normally open, and adapted to cause the clutch mechanism to connect the said parts together or to disconnect them, a circuit-controller therein, normally open, for making and breaking said clutch-circuit, and an electromagnet in another circuit, normally deënergized, arranged and adapted to control the operation of the said circuit-controller in the clutch-circuit, a circuit through said electromagnet, normally open, and a circuit-controller therein, also normally open, under the control of the operator for making or breaking said operating-circuit, whereby upon the closing of the operating-circuit the clutch mechanism will connect said driving parts with the part to be driven, and when the operating-circuit is open, it will disconnect them.

29. In a controlling-engine for a press, the combination of electric clutch mechanism for connecting driving parts with a part to be driven or for disconnecting them, a circuit through said electric clutch mechanism, normally open, and adapted to cause the clutch mechanism to connect the said parts together or to disconnect them, a circuit-controller in said clutch-circuit, normally open, for making or breaking said clutch-circuit, a catch for seizing and holding said circuit-controller in its closed position to cause the clutch-circuit to operate the clutch mechanism, an electromagnet in an operating-circuit, normally deënergized, arranged and adapted to control the operation of the circuit-controller in the clutch-circuit, an operating-circuit through said electromagnet, normally open, also normally, a circuit-controller therein, also normally open, for making or breaking said operating-circuit, and means for releasing the catch to permit the circuit-controller of the clutch-circuit to open, whereby upon the closing of the operating-circuit the clutch mechanism will connect said driving parts with the part to be driven and, when the operating-circuit is broken, it will disconnect them.

30. In a controlling-engine for a press, the combination of electric clutch mechanism for connecting driving parts with a part to be driven or for disconnecting them, a circuit through said electric clutch mechanism, normally open, adapted to cause the clutch mechanism to connect the said parts together or to disconnect them, a circuit-controller in said clutch-circuit, normally open, for making or breaking said clutch-circuit, a catch for seizing and holding said circuit-controller in its closed position to cause the clutch-circuit to operate the clutch, an electromagnet in an operating-circuit, normally deënergized, arranged and adapted to control the operation of the circuit-controller in the clutch-circuit, an operating-circuit through said electromagnet, normally open, a circuit-controller therein, normally open, for making or breaking said operating-circuit, means, automatically actuated by the part to be driven at the limit of its movement, for releasing the catch to permit the circuit-controller of the clutch-circuit to open, whereby the clutch mechanism may be operated to cause it to connect the said driving parts and the said part to be driven or to disconnect them, and whereby the movement of the said part of the press will be automatically stopped at a predetermined point.

31. In a controlling-engine for a press, the combination of electric clutch mechanism for connecting driving parts with a part to be driven or for disconnecting them, a circuit through such electric clutch mechanism, normally open, adapted to cause the clutch mechanism to connect the said parts together or to disconnect them, a circuit-controller in said clutch-circuit, normally open, for making or breaking said clutch-circuit, a catch for seizing and holding said circuit-controller in its closed position, an electromagnet in an operating-circuit, normally deënergized, arranged and adapted to control the operation of the circuit-controller in the clutch-circuit, a circuit through said electromagnet, normally open, a circuit-controller in said operating-circuit, also normally open, for making or breaking said operating-circuit, an electromagnet, normally deënergized, in a releasing-circuit arranged and adapted to withdraw the catch to permit the circuit-controller of the clutch-circuit to open, a releasing-circuit through said last-mentioned electromagnet, normally open, and a circuit-controller therein, also normally open, adapted to be automatically closed by the part to be driven at the limit of its movement to energize the releasing-magnet and cause it to release the catch, whereby the clutch mechanism may be operated to cause it to connect the said driving parts to the said part to be driven or to disconnect them, and whereby the movement of the said part of the press will be automatically stopped at a predetermined point.

32. In a press, the combination of a part of the press to be moved, driving mechanism for moving said part of the press, two clutch gear-wheels connected with said driving mechanism so that either one or the other, or neither of said clutch-wheels, may be in operative connection with the said driving mechanism, electric clutch mechanisms therefor, adapted, when one of the said clutch mechanisms is energized, to put one of said clutch gear-wheels into operative connection with the driving mechanism to cause that part of the latter, connecting with the said part of the press, to be driven in one direction to move the said part of the press one way, and when the other of said clutch mechanisms is energized, to put the other of the said clutch gear-wheels into operative connection with the said part of the driving mechanism to cause it to be driven in the opposite direction to move the said part of the press the other way, and when neither of the said clutch mechanisms is energized, to cause neither of said clutch gear-wheels to be in operative connection whereby the said part of the press will remain at rest, a circuit through each of said electric clutch mechanisms, a circuit-controller in each of said clutch-circuits for making or breaking the circuit, an electromagnet for each circuit-controller, each magnet being in another and separate operating-circuit and each magnet arranged and adapted to control the operation of its respective circuit-controller, a circuit-controller in each of said operating-circuits, under the control of the operator, for making and breaking said circuit, whereby the clutch mechanism may be operated at will to cause the part of the driving mechanism, connecting with the part of the press, to be moved in one direction or the other, or to remain at rest, whereby the movements of the said part of the press may be controlled.

33. In a press, the combination of a part of the press to be moved, driving mechanism for moving said part of the press, two clutch gear-wheels connected with said driving mechanism so that either one or the other or neither of said clutch-wheels may be in operative connection with the said driving mechanism, electric clutch mechanisms therefor, adapted, when one of the said clutch mechanisms is energized, to put one of said clutch gear-wheels into operative connection with the driving mechanism to cause that part of the latter, connecting with the said part of the press, to be driven in one direction to move the said part of the press one way, when the other of said clutch mechanisms is energized, to put the other of the said clutch gear-wheels into operative connection with the said part of the driving mechanism to cause it to be driven in the opposite direction to move the said part of the press the other way, and when neither of the said clutch mechanisms is energized, to cause neither of said clutch gear-wheels to be in operative connection whereby the said part of the press will remain at rest, a circuit through each of said electric clutch mechanisms, a circuit-controller in each of said clutch-circuits for making or breaking the circuit, a catch for each of said circuit-controllers for seizing and holding the said circuit-controller in its closed position to keep the circuit closed through the corresponding clutch mechanism, an electromagnet for each circuit-controller, each magnet being in another and separate circuit and each magnet arranged and adapted to control the operation of its respective circuit-controller, a circuit-controller in each of said operating-circuits under the control of the operator for making and breaking said circuit, an electromagnet for each catch, each of said electromagnets arranged in still another circuit and adapted, when energized, to withdraw the catch to permit the corresponding circuit-controller of the first circuit to open, a separate circuit for each of said last-mentioned electromagnets, and a circuit-controller in each of said circuits, under the control of the operator, for making and breaking said circuit, whereby the clutch mechanism may be operated at will to cause the part of the driving mechanism connecting with the part of the press to be moved in one direction or the other, or to remain at rest whereby the movements of the said part of the press may be controlled.

34. In a controlling-engine for a lithographic press, the combination of a shaft adapted to rotate in either direction, means for rotating it in either direction, damping-frames carrying the damping mechanism of the press, connecting mechanism between the said shaft and the damping-frames, a gear-wheel and an electric clutch intermediate between the shaft and the connecting mechanism for connecting them together or for disconnecting them, a circuit through said electric clutch mechanism adapted to cause the gear-wheel to connect the shaft with the connecting mechanism or to disconnect them, a circuit-controller therein for making or breaking said clutch-circuit, an electromagnet in another circuit arranged and adapted to control the operation of the said circuit-controller in the clutch-circuit, a circuit through said electromagnet and a circuit-controller therein, under the control of the operator, for making or breaking said operating-circuit, whereby the clutch mechanism may be operated at will to move the damping-frames one way or the other depending upon the direction of rotation of said shaft.

35. In a controlling-engine for a lithographic press, the combination of a shaft adapted to rotate in either direction, means for rotating it in either direction, damping-frames carrying the damping mechanism of the press, connecting mechanism between the said shaft and the damping-frames, a gear-wheel and an electric clutch intermediate between the shaft and the connecting mechanism for connecting them together or for disconnecting them, a circuit through said electric clutch mechanism adapted to cause the gear-wheel to connect the shaft with the connecting mechanism or to disconnect them, a circuit-controller therein for making or breaking said clutch-circuit, a catch for seizing and holding said circuit-controller in its operative position to cause the clutch-circuit to operate the clutch, an electromagnet in another circuit arranged and adapted to control the operation of the circuit-controller in the clutch-circuit, a circuit through said electromagnet and a circuit-controller therein, under the control of the operator, for making and breaking said operating-circuit, an electromagnet in a releasing-circuit arranged and adapted to withdraw the catch to permit the circuit-controller of the clutch-circuit to resume its inoperative position, a circuit through said last-mentioned electromagnet and a circuit-controller therein adapted to be automatically closed to energize said electromagnet and withdraw the catch, by the damping-frames as they reach the limit of their movement, whereby the movement of the damping-frames may be controlled.

36. In a controlling-engine for a lithographic press, the combination of a shaft adapted to rotate in either direction, means for rotating it in either direction, printing-cylinders, connecting mechanism between the said shaft and the printing-cylinders, a gear-wheel and an electric clutch intermediate between the shaft and the connecting mechanism for connecting them together or for disconnecting them, a circuit through said electric clutch mechanism adapted to cause the gear-wheel to connect the shaft with the connecting mechanism or to disconnect them, a circuit-controller therein for making or breaking said clutch-circuit, an electromagnet in another circuit, arranged and adapted to control the operation of the said circuit-controller in the clutch-circuit, a circuit through said electromagnet and a circuit-controller therein, under the control of the operator, for making or breaking said circuit, whereby the clutch mechanism may be operated at will to move the printing-cylinders one way or the other depending upon the direction of rotation of said shaft.

37. In a controlling-engine for a lithographic press, the combination of a shaft adapted to rotate in either direction, means for rotating it in either direction, printing-cylinders, connecting mechanism between the said shaft and the printing-cylinders, a gear-wheel and an electric clutch intermediate between the shaft and the connecting mechanism for connecting them together or for disconnecting them, a circuit through said electric clutch mechanism adapted to cause the gear-wheel to connect the shaft with the connecting mechanism or to disconnect them, a circuit-controller therein for making or breaking said clutch-circuit, a catch for seizing and holding said circuit-controller in its operative position, to cause the clutch-circuit to operate the clutch, an electromagnet in another circuit arranged and adapted to control the operation of the circuit-controller in the clutch-circuit, a circuit through said electromagnet and a circuit-controller therein, under the control of the operator, for making and breaking said operating-circuit, an electromagnet in a releasing-circuit arranged and adapted to withdraw the catch to permit the circuit-controller of the clutch-circuit to resume its inoperative position, a circuit through said last-mentioned electromagnet and a circuit-controller therein adapted to be automatically closed, to energize said electromagnet and withdraw the catch, by the printing-cylinders as they reach the limit of their movement, whereby the movement of the printing-cylinders may be controlled.

38. In a controlling-engine for a lithographic press, the combination of a shaft adapted to rotate in either direction, means for rotating it in either direction, inking-frames carrying the inking mechanism of the press, connecting mechanism between the said shaft and the inking-frames, a gear-wheel and an electric clutch intermediate between the shaft and the connecting mechanism for connecting them together or for disconnecting them, a circuit through said electric clutch mechanism adapted to cause the gear-wheel to connect the shaft with the connecting mechanism or to disconnect them, a circuit-controller therein for making or breaking said clutch-circuit, an electromagnet in another circuit arranged and adapted to control the operation of the said circuit-controller in the clutch-circuit, a circuit through said electromagnet and a circuit-controller therein, under the control of the operator, for making or breaking said operating-circuit, whereby the clutch mechanism may be operated at will to move the inking-frames one way or the other depending upon the direction of rotation of said shaft.

39. In a controlling-engine for a lithographic press, the combination of a shaft adapted to rotate in either direction, means for rotating it in either direction, inking-frames carrying the inking mechanism of the press, connecting mechanism between the said shaft and the inking-frames, a gear-wheel and an electric clutch intermediate between the shaft and the connecting mechanism for connecting them together or for disconnecting them, a circuit through said electric clutch mechanism adapted to cause the gear-wheel to connect the shaft with the connecting mechanism or to disconnect them, a circuit-controller therein for making or breaking said clutch-circuit, a catch for seizing and holding said circuit-controller in its operative position, to cause the clutch-circuit to operate the clutch, an electromagnet in another circuit arranged and adapted to control the operation of the circuit-controller in the clutch-circuit, a circuit through said electromagnet and a circuit-controller therein, under the control of the operator, for making or breaking said operating-circuit, an electromagnet in a releasing-circuit arranged and adapted to withdraw the catch to permit the circuit-controller of the clutch-circuit to resume its inoperative position, a circuit through said last-mentioned electromagnet and a circuit-controller therein adapted to be automatically closed, to energize said electromagnet and withdraw the catch, by the inking-frames as they reach the limit of their movement, whereby the movement of the inking-frames may be controlled.

40. The combination, in a press, of a part of the press to be moved, driving mechanism for moving said part of the press, connecting mechanism between the driving mechanism and the part of the press to be moved, adapted to connect the said driving mechanism to the said part of the press or to disconnect them, whereby, when the driving mechanism and the said part of the press are thus connected, motion will be imparted from the driving mechanism to the said part of the press to move the latter and, when the two are disconnected, the said part of the press will remain at rest, clutch mechanism arranged and adapted to cause the said connecting mechanism to connect the driving mechanism with the said part of the press or to disconnect them, means for operating said clutch mechanism and means automatically operated by the said part of the press at the limit of its movement for automatically stopping said part of the press at a predetermined point.

41. In a controlling-engine for a press, a shaft adapted to rotate in either direction, means for rotating it in either direction driven by the driving mechanism of the press, a series of connecting mechanisms connecting with different parts of the press to be moved, a gear-wheel, intermediate between said shaft and each connecting mechanism, capable of connecting or disconnecting the shaft with said connecting mechanism, whereby, when connected to the shaft, the said connecting mechanism will be driven one way or the other, as the shaft is revolved in one direction or the other, and, when disconnected, the connecting mechanism will remain at rest, clutch mechanism for each connecting mechanism, adapted to connect or disconnect the shaft to said connecting mechanism through said gear-wheel, means, under the control of the operator, for operating said clutch mechanism and means, automatically operated by the said different parts of the press, for automatically operating each of said clutch mechanisms to cause it to disconnect the shaft from its connecting mechanism, whereby the operation of the said parts of the press may be controlled and whereby the movements of the different parts of the press may be automatically stopped at predetermined points.

42. The combination in a press, of a part of the press to be moved, driving mechanism for imparting motion thereto, electric clutch mechanism for connecting the driving mechanism with the said part of the press or for disconnecting them, a circuit through the electric clutch mechanism for operating it, a circuit-controller therein, a catch for seizing and holding said circuit-controller in its closed position, an electromagnet in another circuit for withdrawing said catch when energized, and a circuit-controller in said last-mentioned circuit automatically closed by the said part of the press when it reaches the limit of its movement, to energize said electromagnet and withdraw the catch and permit the circuit-controller in the first circuit to open, whereby the movement of the said part of the press may be automatically stopped.

43. In a lithographic press, a shaft adapted to rotate in either direction, means for rotating it in either direction, connecting mechanism connecting with the damping-frames of the press, a gear-wheel intermediate between said shaft and the said connecting mechanism and capable of connecting them together or disconnecting them, whereby when connected to the shaft the connecting mechanism will be driven so as to move the damping-frames one way or the other as the shaft is rotated in one direction or the other, and when the connecting mechanism is disconnected from the shaft the damping-frames will remain at rest, clutch mechanism adapted to connect the shaft with the said connecting mechanism or to disconnect them, means under the control of the operator for causing the clutch mechanism to connect them, and means, automatically actuated, for causing the clutch mechanism to disconnect them, whereby the operation of the damping-frames of the press may be controlled.

44. In a lithographic press, a shaft adapted to rotate in either direction, means for rotating it in either direction, connecting mechanism connecting with the inking-frames of the press, a gear-wheel intermediate between said shaft and the said connecting mechanism and capable of connecting them together or disconnecting them, whereby when connected to the shaft the connecting mechanism will be driven so as to move the inking-frames one way or the other as the shaft is rotated in one direction or the other, and when the connecting mechanism is disconnected from the shaft, the inking-frames will remain at rest, clutch mechanism adapted to connect the shaft with the said connecting mechanism or to disconnect them, means, under the control of the operator, for causing the clutch mechanism to connect them, and means, automatically actuated, for causing the clutch mechanism to disconnect them, whereby the operation of the inking-frames of the press may be controlled.

45. In a lithographic press, a shaft adapted to rotate in either direction, means for rotating it in either direction, connecting mechanism connecting with the printing-cylinders of the press, a gear-wheel intermediately between said shaft and the said connecting mechanism and capable of connecting them together or disconnecting them, whereby, when connected to the shaft, the connecting mechanism will be driven so as to move the printing-cylinders one way or the other as the shaft is rotated in one direction or the other, and when the connecting mechanism is disconnected from the shaft, the printing-cylinders will remain at rest, clutch mechanism adapted to connect the shaft with the said connecting mechanism or to disconnect them, means, under the control of the operator, for causing the clutch mechanism to connect them, and means, automatically actuated, for causing the clutch mechanism to disconnect them, whereby the operation of the printing-cylinders of the press may be controlled.

46. The combination, in a press, of a part of the press to be moved, driving mechanism for moving said part of the press, connecting mechanism between the driving mechanism and the part of the press to be moved, adapted to connect the said driving mechanism to the said part of the press or to disconnect them, whereby, when the driving mechanism and the said part of the press are thus connected, motion will be imparted from the driving mechanism to the said part of the press to move the latter and, when the two are disconnected, the said part of the press will remain at rest, clutch mechanism arranged and adapted to cause the said connecting mechanism to connect the driving mechanism with the said part of the press or to disconnect them, and means for automatically stopping said part of the press at a predetermined point.

47. The combination, in a press, of a part of the press to be moved, driving mechanism for moving said part of the press, connecting mechanism between the driving mechanism and the part of the press to be moved, adapted to connect the said driving mechanism to the said part of the press or to disconnect them, whereby, when the driving mechanism and the said part of the press are thus connected, motion will be imparted from the driving mechanism to the said part of the press to move the latter and, when the two are disconnected, the said part of the press will remain at rest, clutch mechanism arranged and adapted to cause the said connecting mechanism to connect the driving mechanism with the said part of the press or to disconnect them, means for operating the clutch mechanism to connect the driving mechanism with the said part of the press to move the latter out of operative position, and means for automatically stopping such outward movement of the said part of the press at a predetermined point, whereby the movement of the said part of the press may be controlled and limited.

48. The combination, in a press, of inking mechanism, driving mechanism for moving said inking mechanism, connecting mechanism between the driving mechanism and the inking mechanism, adapted to connect the said driving mechanism to the said inking mechanism or to disconnect them, whereby, when the driving mechanism and the said inking mechanism are thus connected, motion will be imparted from the driving mechanism to the said inking mechanism to move the latter and, when the two are disconnected, the said inking mechanism will remain at rest, clutch mechanism arranged and adapted to cause the said connecting mechanism to connect the driving mechanism with the said inking mechanism or to disconnect them, means for operating the clutch mechanism to connect the driving mechanism with the said inking mechanism to move the latter out of operative position, and means for automatically stopping said outward movement of the said inking mechanism at a predetermined point, whereby the movement of the said inking mechanism may be controlled and limited.

49. The combination, in a press, of inking mechanism, driving mechanism for moving said inking mechanism, connecting mechanism between the driving mechanism and the inking mechanism, adapted to connect the said driving mechanism to the said inking mechanism or to disconnect them, whereby, when the driving mechanism and the said inking mechanism are thus connected, motion will be imparted from the driving mechanism to the said inking mechanism to move the latter, and, when the two are disconnected, the said inking mechanism will remain at rest, clutch mechanism arranged and adapted to cause the said connecting mechanism to connect the driving mechanism with the said inking mechanism or to disconnect them, and means for automatically stopping said inking mechanism at a predetermined point.

50. The combination, in a press, of damping mechanism, driving mechanism for moving said damping mechanism, connecting mechanism between the driving mechanism and the damping mechanism, adapted to connect the said driving mechanism to the said damping mechanism or to disconnect them, whereby, when the driving mechanism and the said damping mechanism are thus connected, motion will be imparted from the driving mechanism to the said damping mechanism to move the latter, and, when the two are disconnected, the said damping mechanism will remain at rest, clutch mechanism arranged and adapted to cause the said connecting mechanism to connect the driving mechanism with the said damping mechanism or to disconnect them, and means for automatically stopping said damping mechanism at a predetermined point.

51. The combination, in a press, of damping mechanism, driving mechanism for moving said damping mechanism, connecting mechanism between the driving mechanism and the damping mechanism, adapted to connect the said driving mechanism to the said damping mechanism or to disconnect them, whereby, when the driving mechanism and the said damping mechanism are thus connected, motion will be imparted from the driving mechanism to the said damping mechanism to move the latter and, when the two are disconnected, the said damping mechanism will remain at rest, clutch mechanism arranged and adapted to cause the said connecting mechanism to connect the driving mechanism with the said damping mechanism or to disconnect them, means for operating the clutch mechanism to connect the driving mechanism with the said damping mechanism to move the latter out of operative position, and means for automatically stopping said outward movement of the said damping mechanism at a predetermined point, whereby the movement of the said damping mechanism may be controlled and limited.

52. The combination, in a press, of a part of the press to be moved, driving mechanism for moving said part of the press, connecting mechanism between the driving mechanism and the part of the press to be moved, adapted to connect the said driving mechanism to the said part of the press or to disconnect them, whereby, when the driving mechanism and the said part of the press are thus connected, motion will be imparted from the driving mechanism to the said part of the press to move the latter and, when the two are disconnected, the said part of the press will remain at rest, clutch mechanism arranged and adapted to cause the said connecting mechanism to connect the driving mechanism with the said part of the press or to disconnect them, means for operating the clutch mechanism to connect the driving mechanism with the said part of the press to move the latter out of operative position, a catch for holding the clutch mechanism in engagement to connect the said parts, and means for automatically releasing the catch to disconnect the clutch, whereby the movement of said part of the press may be controlled and limited.

53. The combination, in a press, of inking mechanism, driving mechanism for moving said inking mechanism, connecting mechanism between the driving mechanism and the inking mechanism, adapted to connect the said driving mechanism to the said inking mechanism or to disconnect them, whereby, when the driving mechanism and the said inking mechanism are thus connected, motion will be imparted from the driving mechanism to the said inking mechanism to move the latter and, when the two are disconnected, the said inking mechanism will remain at rest, clutch mechanism arranged and adapted to cause the said connecting mechanism to connect the driving mechanism with the said inking mechanism or to disconnect them, means for operating the clutch mechanism to connect the driving mechanism with the said inking mechanism to move the latter out of operative position, a catch for holding the clutch mechanism in engagement to connect the said parts, and means for automatically releasing the catch and disconnecting the clutch, whereby the movement of said inking mechanism may be controlled and limited.

54. The combination, in a press, of damping mechanism, driving mechanism for moving said damping mechanism, connecting mechanism between the driving mechanism and the damping mechanism, adapted to connect the said driving mechanism to the said damping mechanism or to disconnect them, whereby, when the driving mechanism and the said damping mechanism are thus connected, motion will be imparted from the driving mechanism to the said damping mechanism to move the latter and, when the two are disconnected, the said damping mechanism will remain at rest, clutch mechanism arranged and adapted to cause the said connecting mechanism to connect the driving mechanism with the said damping mechanism or to disconnect them, means for operating the clutch mechanism to connect the driving mechanism with the said damping mechanism to move the latter out of operative position, a catch for holding the clutch mechanism in engagement to connect the said parts, and means for automatically releasing the catch and disconnecting the clutch, whereby the movement of said damping mechanism may be controlled and limited.

55. In a press, the combination with an impression-surface, of a printing-surface, inking mechanism therefor and means for moving said printing-surface and inking mechanism into or out of operative position independently of the ordinary operation of the press and always in a fixed predetermined sequence.

56. In a press, the combination of a printing-surface, inking mechanism and damping mechanism therefor and means for moving said printing-surface and inking and damping mechanisms into or out of operative position arranged and adapted to cause said parts to move into or out of operative position independently of the ordinary operation of the press and always in a fixed predetermined sequence.

57. In a press, the combination with a printing-surface, of inking mechanism and damping mechanism therefor, and means for moving said inking mechanism and damping mechanism into or out of operative position arranged and adapted to cause said parts to move into or out of operative position independently of the ordinary operation of the press and always in a fixed predetermined sequence.

58. In a press, the combination with a printing-surface, of inking mechanism and damping mechanism therefor, and means for moving said inking mechanism and damping mechanism into operative position arranged and adapted to cause said parts to move into operative position independently of the ordinary operation of the press and always in a fixed predetermined sequence.

59. In a press, the combination with a printing-surface, of inking mechanism and damping mechanism therefor, and means for moving said inking mechanism and damping mechanism out of operative position arranged and adapted to cause said parts to move out of operative position independently of the ordinary operation of the press and always in a fixed predetermined sequence.

60. In a press, the combination with a printing-surface, of inking mechanism and damping mechanism therefor, and means for moving said inking mechanism and damping mechanism into operative position arranged and adapted to cause first the damping mechanism to move into operative position and then the inking mechanism to move into operative position independently of the ordinary operation of the press.

61. In a press, the combination with a printing-surface, of inking mechanism and damping mechanism therefor, and means for moving said inking mechanism and damping mechanism out of operative position arranged and adapted to cause first the inking mechanism to be moved out of operative position and then the damping mechanism to be moved out of operative position independently of the ordinary operation of the press whereby the damping mechanism will always be kept in operative connection with the printing-surface until after the inking mechanism has been moved out of operative connection with the printing-surface.

62. In a press, the combination with a printing-surface, of inking mechanism and damping mechanism therefor, means for moving said inking mechanism and damping mechanism into operative position arranged and adapted to cause first the damping mechanism to move into operative position and then the inking mechanism to move into operative position independently of the ordinary operation of the press, and means for moving said inking and damping mechanisms out of operative position arranged and adapted to cause first the inking mechanism to be moved out of operative position and then the damping mechanism to be moved out of operative position independently of the ordinary operation of the press, whereby the printing-surface will be damped before it is inked and the damping mechanism will always be kept in operative connection with the printing-surface until after the inking mechanism has been moved out of operative connection with the printing-surface.

In testimony whereof I have signed my name to this specification in the presence of two subscribing witnesses.

EDWARD HETT.

Witnesses:
 EDWIN SEGER,
 SIDNEY MANN.